United States Patent [19]

Tsukada

[11] Patent Number: 4,766,447

[45] Date of Patent: Aug. 23, 1988

[54] IMAGE DISPLAY APPARATUS

[75] Inventor: Masaharu Tsukada, Kawasaki, Japan

[73] Assignee: Canon Kabushiki Kaisha, Tokyo, Japan

[21] Appl. No.: 11,399

[22] Filed: Feb. 4, 1987

Related U.S. Application Data

[63] Continuation of Ser. No. 654,108, Sep. 24, 1984, abandoned.

[30] Foreign Application Priority Data

| | | | |
|---|---|---|---|
| Sep. 29, 1983 | [JP] | Japan | 58-179423 |
| Sep. 29, 1983 | [JP] | Japan | 58-179424 |
| Sep. 29, 1983 | [JP] | Japan | 58-179425 |
| Sep. 29, 1983 | [JP] | Japan | 58-179426 |
| Oct. 17, 1983 | [JP] | Japan | 58-193864 |
| Oct. 17, 1983 | [JP] | Japan | 58-193866 |
| Oct. 17, 1983 | [JP] | Japan | 58-193867 |

[51] Int. Cl.[4] .......... G01D 15/00

[52] U.S. Cl. .......... 346/150; 341/160

[58] Field of Search .......... 358/287, 288, 300; 346/160, 107 R, 108, 150; 400/119; 101/DIG. 13; 340/755, 753, 776

[56] References Cited

U.S. PATENT DOCUMENTS

| | | | |
|---|---|---|---|
| 4,445,128 | 4/1984 | Dolan et al. | 346/160 |
| 4,449,152 | 5/1984 | Kurata et al. | 358/288 |
| 4,547,787 | 10/1985 | Kaneko et al. | 346/160 |

*Primary Examiner*—Arthur G. Evans

*Attorney, Agent, or Firm*—Fitzpatrick, Cella, Harper and Scinto

[57] ABSTRACT

There is provided an image display apparatus which imputs image information and displays it on a large display surface. This apparatus comprises: a photo sensitive material belt; rollers to support and drive the belt and a motor to rotate the drive roller; an image exposing apparatus of the laser beam scanning method; a toner developer; a pulse generator for continuously generating pulses in association with the rotation of the drive roller; a counter to count the pulses; and a controller to control the stop timing of the drive roller in order to stop the movement of the belt in accordance with the count value of the counter. The movement of the belt is controlled at the accurate timing synchronized with the pulses from the pulse generator. Thus, it is prevented that a joint of the belt appears in the display section, and the image information is displayed at the proper location in the display surface. Also, since the image exposure is performed by the extremely thin laser beam, the image information such as small and thin characters, graphics, etc. can be clearly displayed, so that the image with good visibility is derived. A coordinate pattern can be also added onto the display image for easy editing.

41 Claims, 19 Drawing Sheets

IMAGE DISPLAY APPARATUS

This application is a continuation of application Ser. No. 654,108 filed Sept. 24, 1984 now abandoned.

BACKGROUND OF THE INVENTION

1. Field of the Invention

The present invention relates to an image display apparatus for forming an image on an image holding material.

2. Description of the Prior Art

As an image display apparatus for displaying image information converted to an electrical signal as a visual image, a CRT (cathode ray tube) display apparatus and a liquid crystal display apparatus have been put into practical use so far.

Among, them, the CRT display apparatus is most generally used and has a high reliability. However, since a resolution power of such an apparatus is not so high, it is impossible to display small characters such as used in a newspaper, magazine and the like, particularly, thin characters having a number of strokes such as KANJI (Japanese characters) or the like with the sizes as they are. Therefore, they are enlarged and displayed for easy interpretation. But, this enlarged indication causes a problem such that the amount of information which is displayed on one screen decreases since the number of characters which can be displayed on one screen is reduced in inverse proportion to the magnification factor. In addition, when the same image is displayed continuously for a long time, the screen could be burned out, causing the display capability to deteriorate. Further, the flickering of screen results in fatigue of the eyes of the operator. Next, the liquid crystal display apparatus is the display device which has been recently put into practical use. However, this apparatus has an insufficient resolution similarly to the CRT display apparatus and also has other problems such that it is difficult to make a large LCD screen and that it will have become expensive.

Consequently, as a third image display apparatus without the above-mentioned drawbacks, the present applicant has already proposed an image display apparatus using an electrophotographic method such as shown in FIGS. 1 and 2.

In the diagrams, a reference numeral 1 denotes a vertical type external apparatus housing; 2 is a display image observation hole which is largely opened and formed in the front plate of the external housing 1; 3 an operation panel arranged on the upper surface of the lower projecting portion of that front plate which is formed by being protruded on this side; 4 a display window glass attached to the observation hole 2; and 5, 6, 7, and 8 indicate four supporting rollers for a photosensitive material like an endless belt. These supporting rollers are individually rotatably arranged through bearings in the manner such that each two rollers are disposed respectively at the upper and lower portions in the external housing 1 and their axes are parallel to one another in the lateral direction of the external housing 1. A numeral 9 is a photosensitive material like an endless belt which is supported around the four rollers 5 to 8.

This photosensitive material 9 like an endless belt (hereinafter, simply referred to as a belt) is, for example, a transparent sheet whose base layer is a polyester sheet or the like. A metal is extremely thinly evaporation deposited on the outer surface of the sheet and conductivity is imparted thereto while substantially keeping the transparency, thereby forming a photosensitive material layer (photo conductive layer) such as CdS or the like on the side of the metal deposited surface. The photosensitive material 9 is therefore flexible as a whole and is supported by the above four rollers such that the side of the photosensitive material layer faces the outside.

The roller 5 among the four rollers 5 to 8 is used as a drive roller serving to transferring the rotational force of a motor $M_1$ (not shown). At least one of the other three rollers 6 to 8, e.g., the roller 6 acts as a belt tension roller to apply the tension to the wound belt 9. Thus, when the drive roller 5 is counterclockwise rotated by the motor $M_1$ at the upper portion of FIG. 2, the belt 9 is rotates counterclockwise without slack and slip. In association with this rotation, the outer surface of the belt 9 moves and passes from the bottom to the top at the portion of the observation hole 2 between the rollers 5 and 8.

A numeral 10 indicates an image exposing apparatus of the laser beam scanning method which is disposed in position in the space inside the belt 9. This image exposing apparatus 10 has a semiconductor laser oscillator 11, a polygonal mirror scanner 12, an f.$\theta$ lens (image forming lens) 13, a reflecting mirror 14, and a transparent plate 15. The transparent plate 15 is the transparent flat plate such as glass, plastic or the like having a long lateral width that is disposed by being pressed by a proper pressure so as to be come into contact with the inner surface of the tensioned belt portion between the belt supporting rollers 7 and 8.

In this image exposing apparatus 10, a laser intermittent beam L corresponding to a serial electrical pixel signal which is supplied from an electronic computer, image reading apparatus or the like is generated from the semiconductor laser oscillator 11 locating at the front portion of the drawing toward the rotating polygonal mirror scanner 12 locating at the rear portion of the drawing. The laser beam L entered the scanner 12 is deflected in the direction of width of the belt and passes through the path of the f.$\theta$ lens 13, reflecting mirror 14 and transparent plate 15. Then the laser beam L enters the side of the inner surface of the belt 9 between the rollers 7 and 8 and scans on the belt in the direction of width of the belt. Due to this, the laser beam scan is used as the main scan and the rotational movement of the belt 9 is used as the sub-scan, thereby performing the image exposure by the laser beam from the side of the inner surface of the belt.

A numeral 16 denotes a toner developer disposed on the side of the outer surface of the belt portion between the rollers 7 and 8. In addition, the transparent plate 15 is arranged such that the lower surface is slightly projected downwardly from the common tangential line on the lower sides of the rollers 7 and 8 and is pressed to be come into contact with the inner surface of the belt 9. End faces $15_1$ and $15_2$ of the plate 15 on the incoming and outgoing sides of the belt are bevelled and rounded for allowing the belt 9 to be smoothly moved in contact relation therewith. Further, this transparent plate 15 prevents the vertical oscillation of the belt 9 which is caused due to the vertical motion of the belt 9 which is rotationally moved and due to the contact of the developer 16 with a developing brush 35 made of magnet, thereby holding the exposure position at a constant location and improving the resolution power.

First, when a display start command is inputted with a key after setting the desired conditions such as an input instruction of image information, designation of the image display position and the like by the operation with the buttons on the operation panel 3, the belt 9 serving as the photosensitive material starts rotating at a predetermined speed. Next, the laser beam scanning exposure of the image information inputted from a reader, disk or the like is started on the side of the inner surface of the belt 9 between the rollers 7 and 8. Since the toner of the developer 16 acts on the outer surface of the belt simultaneously with this exposure, the toner image corresponding to the exposed image is sequentially formed on the outer surface of the belt 9. When the toner image formed on the outer surface of the belt is rotated and moved from the bottom to the top of the observation hole 2 in association with the rotational movement of the belt 9 and reaches the specified position within a range of the hole, the rotation of the belt 9 is once stopped. Thus, the input image is displayed at the portion of the observation hole 2, thereby allowing the image to be observed through the display window glass 4. Next, when the belt 9 is rerotated in response to a command for instructing the rerotation of the belt, the toner image corresponding to the next input image is formed due to the processing similar to that mentioned above and is moved to the hole range position, so that the next image is displayed. When the toner image on the outer surface of the belt upon completion of the display of the image again reaches the section of the toner developer 16 in association with the rotation of the belt, it is cleaned by the developing brush 35 and the toner is removed from the belt. The belt 9 is newly subjected to the exposure simultaneous development immediately after this cleaning operation, so that a new toner image is formed.

In this way, the image information is reproduced and displayed as a toner image, and the image exposure is performed by use of the very thin laser beam L; therefore, it is possible to perform the image display with high resolution whereby small characters and images can be easily observed and clearly displayed. Moreover, since the exposure simultaneous toner developing method is adopted, this makes it possible to relatively cheaply manufacture an image display apparatus of a large screen with an extremely simple arrangement without requiring any corona charging means or any particular cleaning means. Also, it is possible to constitute a display apparatus with high reliability but less failure and less degradation of the photosensitive material.

However, as described above, since the toner image attached to the belt 9 is moved to a proper location of the glass window 4, it is necessary to match the operation timings in each section of the apparatus such as the timing to write the image, the timing to stop the drive motor $M_1$, etc. in accordance with the rotational position of the belt 9. Due to this, conventionally, as shown in FIG. 3, for instance, one or two chains 39 are suspended at a predetermined position of the side end of the belt 9 or near both side ends of the belt 9 and are driven by the drive roller 5; a light shielding plate 40 is formed at a predetermined location of the chain 39 so as to protrude therefrom; and an operation timing signal is generated when this light shielding plate 40 passes through a groove of a photo interrupter 41 disposed along the moving surface of the belt 9; thereby directly detecting the rotational position of the belt 9 by means of the belt 9 or chain 39.

However, since the belt 9 or chain 39 has a band-like shape, they could cause a vertical fluttering (waving) in the moving direction while they are rotating. Thus, there is a problem such that the light shielding plate 40 hits the photo interrupter 41 due to such fluttering, so that the photo interrupter 41 is easily damaged. In case of directly detecting the rotational position of the belt 9 as the photosensitive material by means of the belt 9 or chain 39, this problem will be always caused even if other detecting means such as a microswitch, hall device or the like is used.

In addition, in such an image display apparatus, another problem occurs when there is a difference in size between the display surface and the display image. For instance, it is assumed that the display image of the vertical A4 size is inputted to the display surface of the vertical A3 size. In the case where the image of the vertical A4 size is displayed using image display means of the vertical A3 size, the image of the vertical. A4 size is displayed at the upper left location on the display surface. In this way, when the sizes of the display surface and display image differ, the display location is one-sided, causing a drawback such that it is extremely difficult for the operator to observe the image.

On the other hand, since the above-described image display apparatus merely displays the image inputted, there is another drawback such that it is difficult to designate the location (or to designate the location when a map and the like are displayed, or the like) when images are editted.

Further, in such a kind of apparatus, the position where the belt stops is not fixed but may be often shifted due to the inertia. This shift amount is accumulated and a joint of the belt appears in the image display surface, so that this may results in an unsightly image.

Also, in such a kind of apparatus, there is a case where the display location of the image information is shifted when the image is displayed, causing a situation such that all of the image information of one page cannot be displayed.

In addition, in such a kind of apparatus, after the power supply was turned on, the image display is started from the stop position of the belt at that time, so that the display location of the image is not constant and the image is displayed over a joint of the belt, causing an unseemly image.

Moreover, in such a type of apparatus, there is a case where an abnormal operation such that the belt does not stop after rotation due to some reason occurs. However, since this kind of apparatus does not have any particular operation sequence, the power supply of the apparatus has to be turned off to solve this abnormal operation.

SUMMARY OF THE INVENTION

It is an object of the present invention to remove the above-mentioned drawbacks.

Another object of the invention is to improve an image display apparatus.

Still another object of the invention is to provide an image display apparatus which is controlled at accurate operation timings.

Still another object of the invention is to provide an image display apparatus which is accurately driven and controlled.

Still another object of the invention is to provide an image display apparatus which can obtain an image which is easy to see.

Still another object of the invention is to provide an image display apparatus which displays a display image in a predetermined location of the image display surface.

Still another object of the invention is to provide an image display apparatus in which the rear ends of the display image and image display surface are made coincident, thereby increasing visibility of the image.

Still another object of the invention is to provide an image display apparatus in which the centers of the display image and image display surfaces are made coincident, thereby increasing visibility of the image.

Still another object of the invention is to provide an image display apparatus in which both an image and a coordinate pattern are together displayed and thereby to contemplate the easy designation of locations when the image is edited.

Still another object of the invention to provide an image display apparatus which can obtain an image that is easy to see without allowing a joint of the image holding material to appear in the display surface.

Still another object of the invention is to provide an image display apparatus which can derive an image that is easy to see by eliminating the shift of the display image from the image display surface.

Still another object of the invention is to provide an image forming apparatus which can obtain an image that is easy to see by preventing the image from being formed on a joint of the image holding material.

Still another object of the invention is to provide an image display apparatus which detects an abnormal operation of the image holding material, thereby preventing the abnormal operation.

The other objects of the present invention will become apparent from the following detailed description with reference to the accompanying drawings and from the appended claims.

DETAILED DESCRIPTION OF THE PREFERRED EMBODIMENTS

The present invention will now be described in detail hereinbelow with reference to the drawings.

Figure 1:
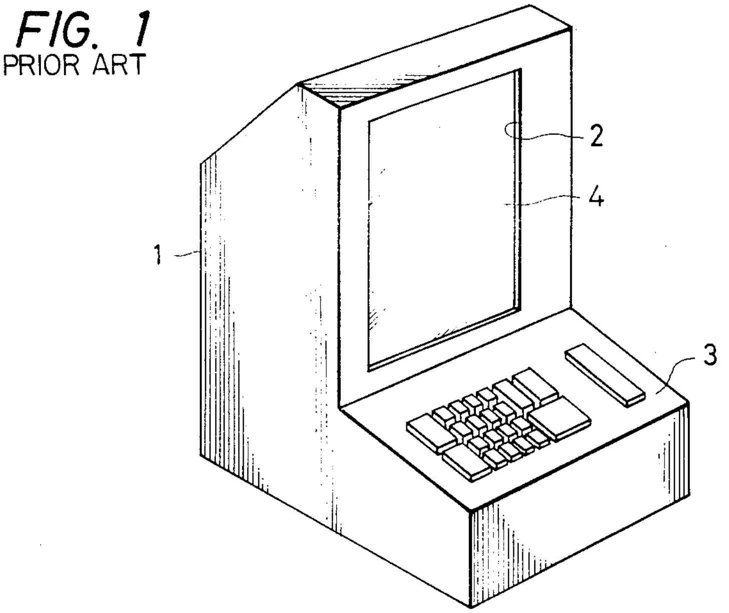
FIG. 1 PRIOR ART
FIG. 1 is a perspective view showing an example of an image display apparatus which has been conventionally known.
Figure 2:
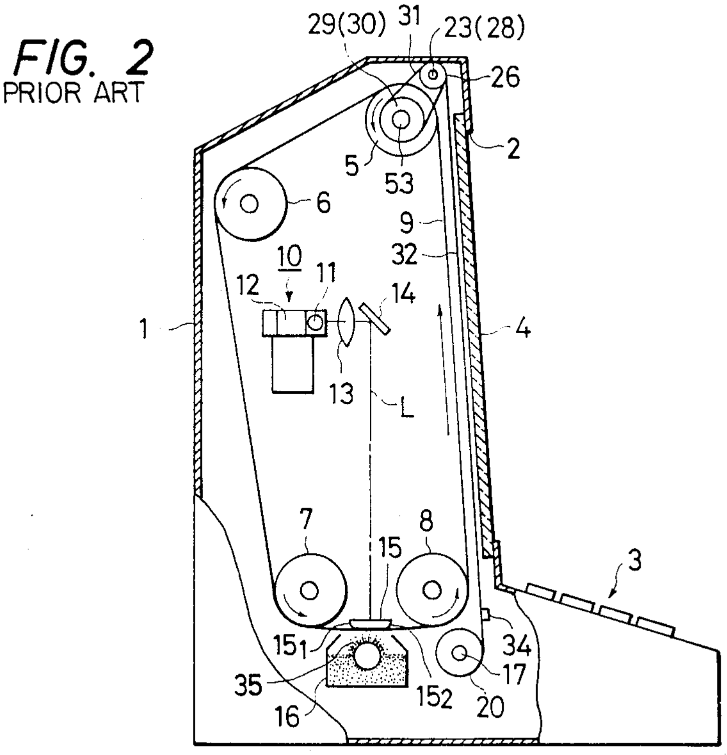
FIG. 2 PRIOR ART
FIG. 2 is a cross sectional view showing an internal arrangement example of the apparatus shown in FIG. 1.
Figure 3:
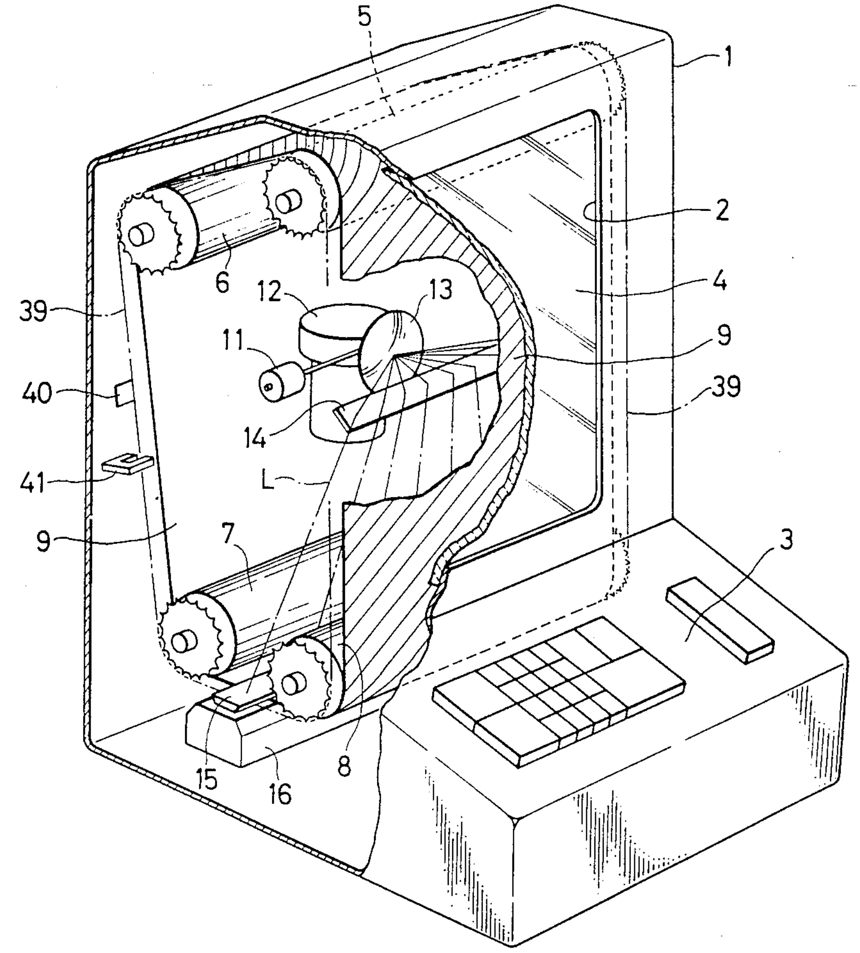
FIG. 3 PRIOR ART
FIG. 3 is a perspective view of the apparatus of FIG. 1 with a main part cut away.
Figure 4:
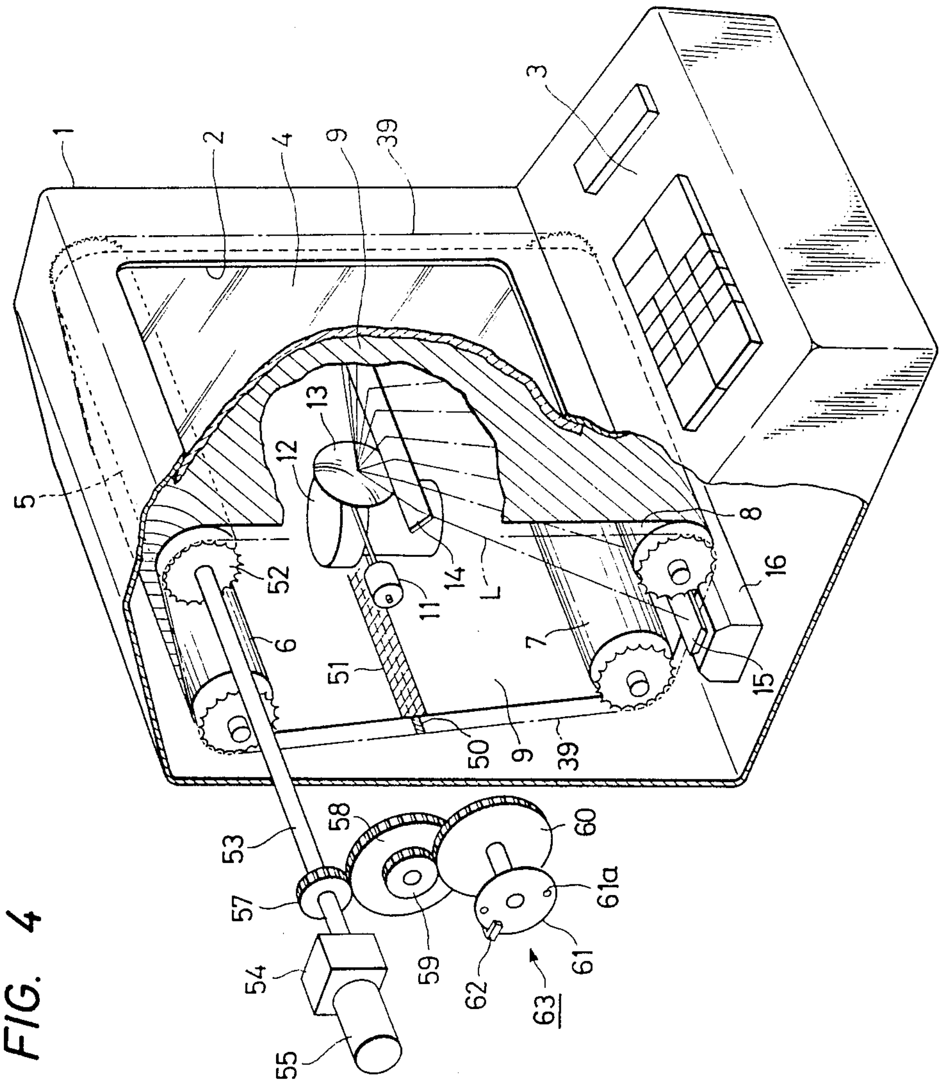
FIG. 4 is a perspective view with a part cut away, showing an embodiment of the present invention.

FIG. 4 illustrates an example of an arrangement of an image display apparatus of the present invention, in which the same parts and components as those shown in a conventional example of FIGS. 1 to 3 are designated by the same reference numerals. In FIG. 4, a plate stay 50 couples the photosensitive material 9 like an endless belt with the two chains 39 and is attached at the locations such as, for example, a junction 51 or the like of the belt-like photosensitive material 9. The rotation of the drive roller 5 coupled to the drive motor $M_1$ (not shown) is transferred to the chains 39 which are in engagement with sprocket wheels 52 attached to both ends of the roller 5 and to the photosensitive material 9 coupled to the chains 39. Thus, the photosensitive material 9 is rotated in association with the rotation of the drive roller 5.

A numeral 53 denotes an extension drive shaft which is formed by extending the rotary shaft of the drive roller 5, and 55 is a DC servo motor for rotating the drive roller 5. The rotation of the DC servo motor 55 is transferred to the extension drive shaft 53 through a gear hand 54. In this embodiment, the rotating speed of the DC servo motor 55 is set to 3000 r.p.m. and a gear ratio of the gear head 54 is set to 1/60. Thus, the rotating speed of the drive roller is 50 r.p.m.

A rotation detection signal (24 pulses/rotation) proportional to the rotation of the motor is outputted from the DC servo motor 55 in order to control the rotating speed so that it becomes constant. This signal is fed back to a motor drive circuit (not shown), thereby controlling the motor so that it rotates at a constant speed. Further, in this embodiment, this rotation detection signal is used as signal generating detection means (belt clock sensor) for obtaining the operation timing for every page. In addition, a series of gear train 57 to 60 which are driven by the rotation of the extension drive shaft 53 are provided. A circular light shielding plate 61 is fixed to the axial end of the gear 60. A hole 61_a_ formed in the circular light shielding plate 61 and a photo interrupter 62 which passes through the hole 61_a_ together constitute a photo encoder 63 which is used as home position detection means (home position sensor) for each page. Therefore, gear ratios of the above-mentioned gear train are set such that the light shielding plate 61 always rotates once for one rotation of the photosensitive material 9 or one page display cycle.

The other arrangement is nearly similar to that of the conventional apparatus shown in FIGS. 1 and 3; therefore, its detailed description is omitted.

Figure 5:
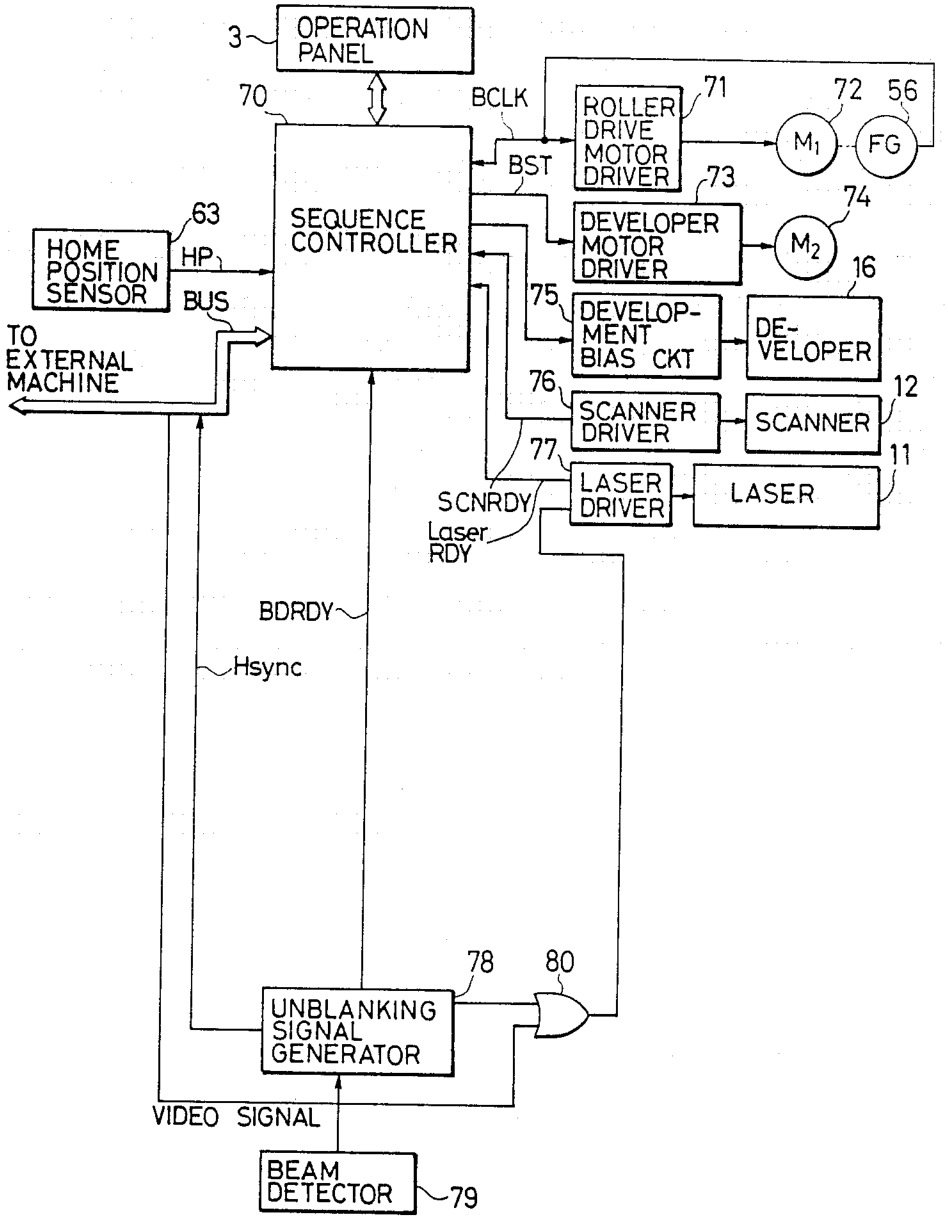
FIG. 5 is a control circuit diagram of the apparatus shown in FIG. 4.

FIG. 5 shows an example of a control circuit for the image display apparatus shown in FIG. 4. In the diagram, a numeral 70 denotes a sequence controller which recognizes the operations designated by the operator on the basis of the input signals from the operation panel 3 for designating various conditions such as the start of display operation, display page numer and the like, thereby controlling and managing prescribed operation. A numeral 71 is a driver (drive circuit) for a roller drive motor (DC servo motor $M_1$) 72 to drive the photosensitive material (i.e., belt) 9. This roller drive motor 72 has therein a signal generator (FG) 56 for generating a signal proportional to the rotation of the motor 72. This signal is fed back to the roller driver motor driver 71, thereby allowing the roller drive motor 72 to always rotate at a constant speed. Therefore, the photosensitive material 9 moves at a constant velocity. Further, in this embodiment, this rotation detection signal is used as a signal (BCLK) for detecting the location of the photosensitive material 9. This signal BCLK is inputted to the sequence controller 70. This embodiment is constituted such that the rotating speed of the roller drive motor 72 is 3000 r.p.m., the signal BCLK of 24 pulses is generated per rotation of the roller drive motor 72; the gear ratio of the gear head 54 is 1/60; the whole length of the photosensitive material 9 like an endless belt is 1300 mm; and the photosensitive material 9 rotates once as the belt drive roller rotates eight times. Consequently, the length of the photosensitive material 9 corresponding to one pulse of the signal BCLK becomes about 1.0 mm/pulse. Thus, the location of the photosensitive material 9 can be extremely accurately detected.

A numeral 73 denotes a driver for a developer motor 74 to drive the developing sleeve (developing brush) 35, and 75 is a development bias circuit which outputs a development bias voltage of +200 to +300 V to the developer 16. The ON-OFF (intermittent) operations of the above drivers 71 and 73 and development bias circuit 75 are all controlled by control signals from the sequence controller 70. An output signal HP of the home position sensor (photo encoder) 63 attached through the gear train 57 to 60 from the extension drive shaft 53 of the drive roller 5 is supplied as an absolute position detection signal of the photosensitive material 9 to the sequence controller 70. The sequence controller 70 detects this output signal HP and starts counting the belt clock signal BCLK. Due to this, the sequence controller 70 judges the drive timings for the respective driving sections 71, 73 and 75 and performs the proper sequence control for the image display.

The output signal HP at this time indicates the reference location, e.g., front end location of the display page section of the photosensitive material 9. Therefore, in the case where, for instance, the light shielding plate 61 equipped with the sensor 63 rotates once per rotation of the photosensitive material 9 and where image information of two pages can be written on the photosensitive material 9, the hole 61*a* is formed at regular intervals in two portions of the light shielding plate 61 (refer to FIG. 4), thereby allowing two signals HP to be outputted per rotation of the light shielding plate 61.

A numeral 76 denotes a scanner driver for driving the scanner 12 which scans the laser beam from the laser oscillator 11 in the main scanning direction. The scanner driver 76 also supplies a signal SCNRDY representing whether the scanner 12 is rotating at a constant speed or not to the sequence controller 70. A numeral 77 is a laser driver for driving the laser oscillator 11. The laser driver 77 also supplies to the sequence controller 70 a signal Laser RDY indicating whether or not there is abnormality such as abnormal temperature control or the like in the laser oscillator 11.

A numeral 78 is an unblanking signal generator for generating an unblanking signal which is used to emit the laser beam in the non-image forming region in the main scanning direction, and 79 is a beam detector which detects the laser beam and supplies a laser beam detection signal BD to the unblanking signal generator 78. The unblanking signal generator 78 generates a sync signal Hsync which is used to get the synchronization of a video signal in the main scanning direction which is transmitted from an external machine (not shown) such as an image reading apparatus, external memory device, etc. in response to the detection signal BD outputted from the beam detector 79. Therefore, the unblanking signal together with the video signal is supplied to the laser driver 77 through an OR gate 80. Further, in the unblanking signal generator 78, the detecting operation such as the detection of out of synchronization of the scanning in the main scanning direction, or the like is also performed on the basis of the ditection signal BD from the beam detector 79. A detection signal BDRDY at this time is supplied to the sequence controller 70.

Moreover, an interface signal for communication and connection with an external machine is also supplied through a BUS to the sequence control 70, so that commands or data can be exchanged with the external machine.

Figure 6:
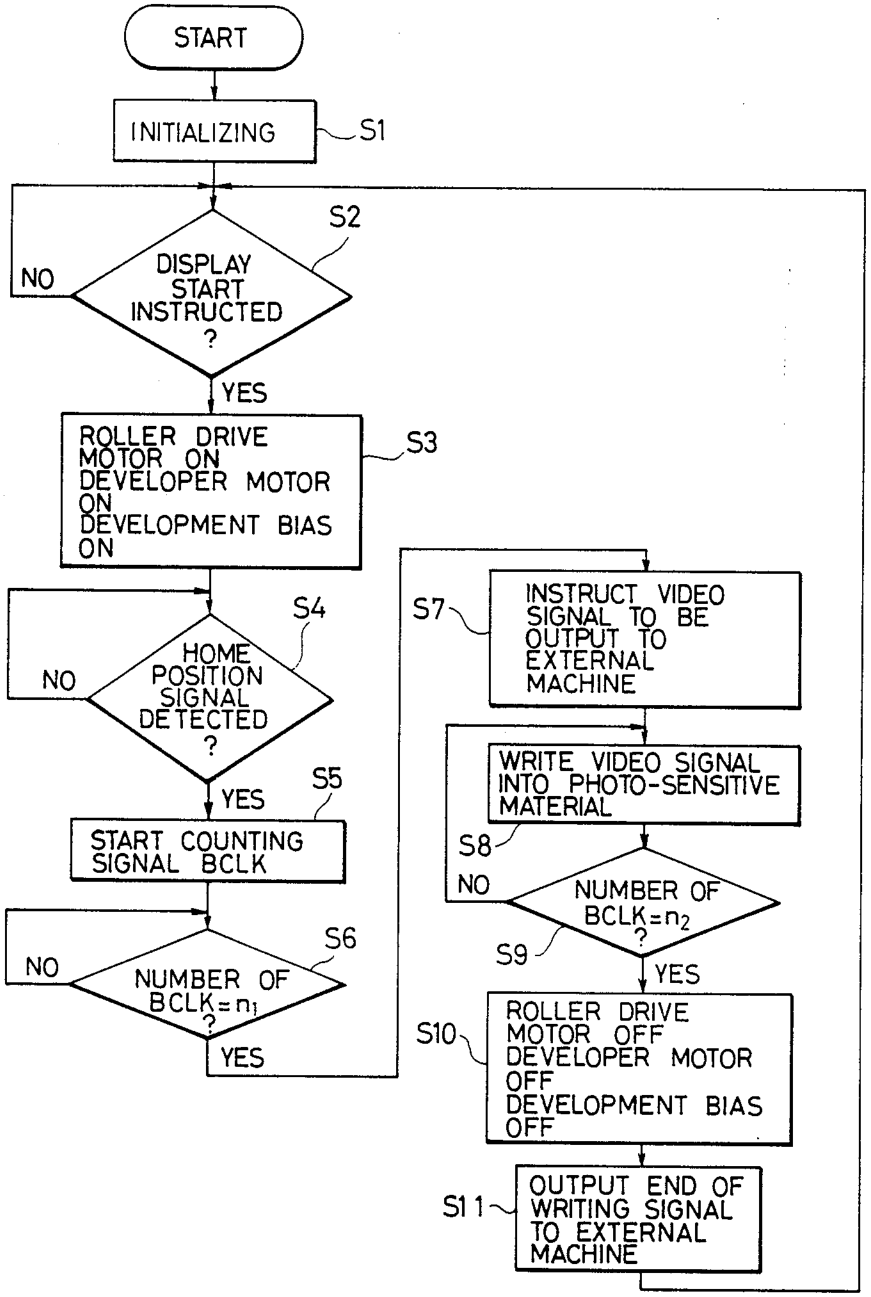
FIG. 6 is a flow chart showing the control procedure for the circuit of FIG. 5.
Figure 7:
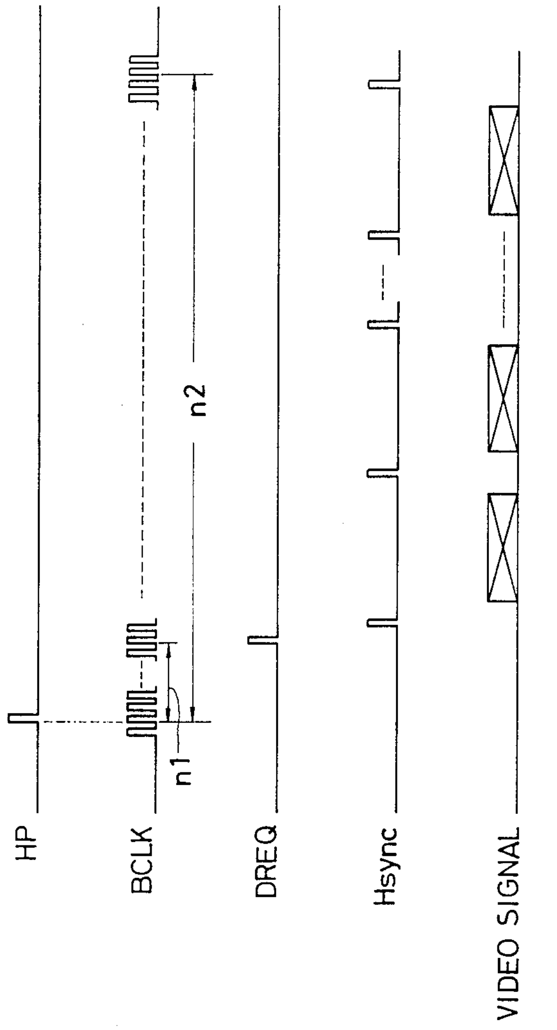
FIG. 7 shows time charts for principal signals in FIG. 5.

Next, an example of the control operation for the sequence controller 70 of FIG. 5 will be described with reference to a flow chart of FIG. 6. FIG. 7 shows time charts for the principal signals in FIG. 5.

First, after the power supply was turned on, the respective driving sections 72, 74 and 16 are initialized and the initialization processings such as the diagnosis of abnormality of each section and the like are carried out in step S1. Thereafter, in step S2, a check is made to see if a display start command was generated or not from the operation panel 3 while observing a key input from the operation panel 3 and an interface signal with an external machibne. When it is determined that the display start command was generated, the operation advances to next step S3 and the roller drive motor 72 is driven to start the rotation of the photosensitive material 9. In addition, the developer motor 74 is driven and a development bias voltage is applied to the developer 16, thereby enabling an image to be written into the photosensitive material 9.

Subsequently, in step S4, a check is made to see if the home position signal HP which is generated from the home position sensor 63 in correspondence to the rotational location of the photosensitive material 9 is outputted or not. When the signal HP is detected, the operation advances to next step S5, so that a counter (not shown) starts the counting of the belt clock signal BCLK which is supplied from the rotation signal generator 56 of the roller drive motor 72. Since the signal HP represents the reference position of the display page section, the location when the count number of the signal BCLK reaches a predetermined value n1 from the time when the signal HP has been received becomes the location where the writing of an image should be started. For this purpose, in next step S6, a check is made to see if the count number of the signal BCLK reaches the predetermined value n1 or not. When the count number becomes n1, a transmission command signal DREQ to instruct the transmission of the video signal is sent through the BUS to an external machine in step S7.

When a constant time interval elapsed after the transmission command signal DREQ had been sent, in step S8, the sync signal Hsync is outputted so the external machine, so that the video signal synchronized with the sync signal Hsync is transmitted from the external machine. In response to the video signal, the laser driver 77 and laser oscillator 11 are driven and the laser beam L is driven and controlled. Thus, the writing of an image into the photosensitive material 9 is started. The counting operation of the signal BCLK is continuously executed as well during this writing operation. Next in step S9, a check is made to see if the count number of the signal BCLK reaches a predetermined value n2 or not. When the count number of the signal BCLK becones n2, it is determined that the writing processing to the page section ended, so that next step S10 follows. Thus, the roller drive motor 72 is stopped, the developer motor 74 is stopped, and the outputting of the development bias voltage is stopped. Subsequently, in step S11, an end of writing signal representating that the writing of the designated page section ended is sent to the external machine. In this state, the image written into the photosensitive material 9 is displayed in the observation hole 2. After completion of the display, the processing returns to step S2 and the above-described processings are repeated in accordance with the display start command.

Next, another embodiment will be explained.

Figure 8:
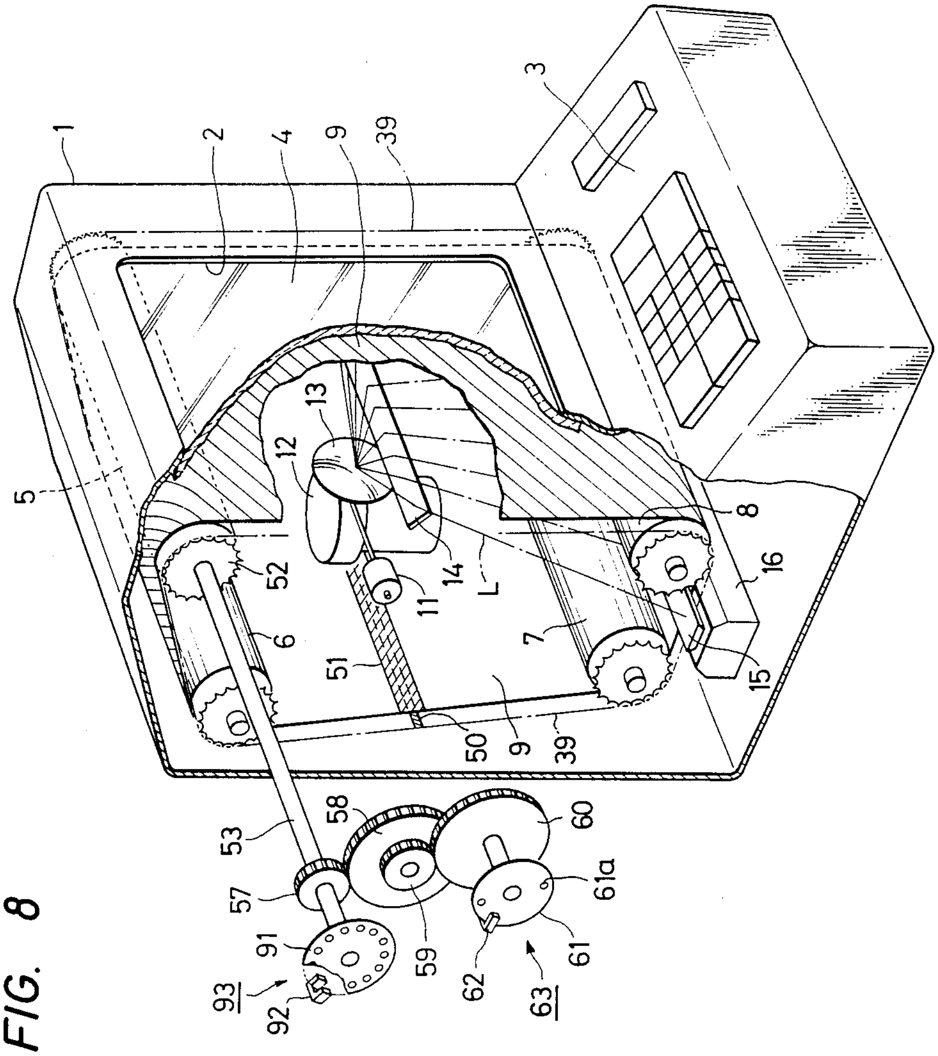
FIG. 8 is a cross sectional arrangement diagram illustrating one embodiment of the invention.

FIG. 8 illustrates an embodiment of the image display apparatus to which the present invention was applied, in which the same parts and components as those shown in the conventional embodiment and in the foregoing embodiment are designated by the same reference numerals.

In FIG. 8, a numeral 91 denotes a circular light shielding plate having holes or teeth which is fixed to the axial end of the extension drive shaft 53, and 92 is a photo interrupter through which the hole portion or tooth portion of the circular light shielding plate 91 passes. These light shielding plate 91 and photo interrupter 92 constitute a photo encoder 93 which is used as signal generating detection means (belt clock sensor) for obtaining the operation timing for every page.

The other arrangement and operation are substantially similar to those in the conventional apparatus and in the apparatus in the foregoing embodiment shown in FIGS. 1 to 4; therefore, their detailed descriptions are omitted.

Figure 9:
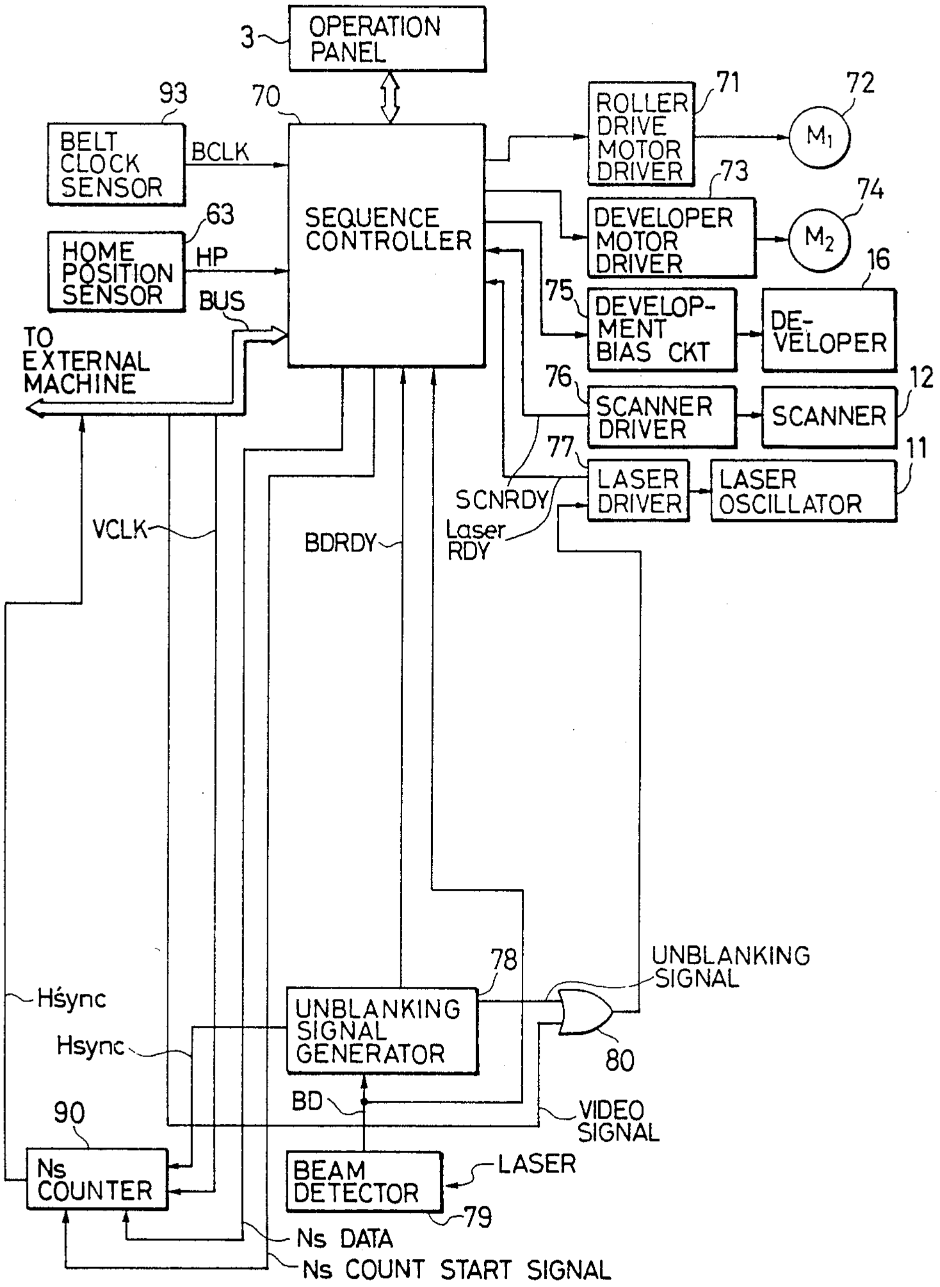
FIG. 9 is a control circuit diagram of the apparatus shown in FIG. 8.

FIG. 9 shows a control circuit of the image display apparatus shown in FIG. 8, in which the same parts and components as those shown in the foregoing embodiment in FIG. 5 are designated by the same reference numerals.

The output signal BCLK of the belt clock sensor (photo encoder) 93 directly attached to the shaft 53 of the drive roller 5 and the output signal HP of the home position sensor (photo encoder) 63 attached through the gear train 57 to 60 from the shaft 53 of the drive roller 5 are respectively supplied as position detection signals of the photosensitive material 9 to the sequence controller 70. The sequence controller 70 judges the drive timings for the respective driving sections 71, 73 and 75 on the basis of these signals BCLK and HP received, thereby performing the proper sequence control.

On the other hand, a numeral 90 is an Ns counter. Its function will then be explained in conjunction with FIG. 10 mentioned below.

In addition, since the other arrangement and operation are substantially equal to those of the foregoing embodiment of FIG. 5, there detailed descriptions are omitted.

Figure 10:
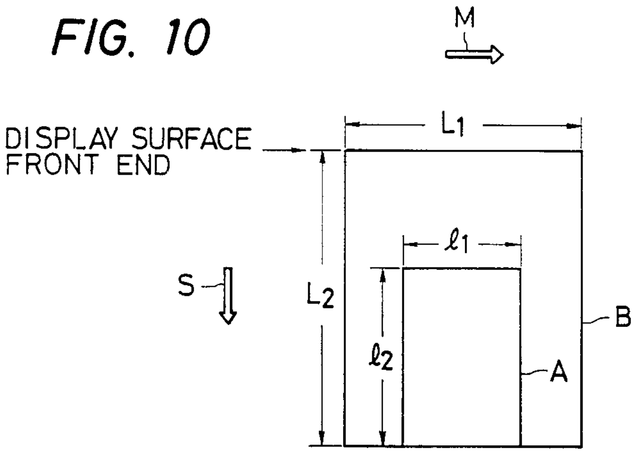
FIGS. 10 and 13 are diagrams showing a display section of the apparatus shown in FIG. 8, respectively.

FIG. 10 shows only the display section in this embodiment, in which B indicates the display surface of the photosensitive material and A represents a display image. Also, $L_1$, $L_2$, $l_1$, and $l_2$ indicate respective dimensions.

In the diagram, the laser beam is scanned from the left to the right (hereinbelow, this scanning is referred to as a main scan and is represented by an arrow M). Further, the photosensitive material 9 is driven from the bottom to the top (therefore, the image is formed from the top to the bottom; this is hereinafter referred to as a sub-scan and is represented by an arrow S), so that the display image is formed. In order to always make the rear end of the image A coincident with the rear end of the display surface B, it is necessary to properly determine the write timing for the image in each of the main and sub-scanning directions.

The write timing for the image in the sub-scanning direction S is determined as follows.

The lengths in the sub-scanning direction S of the display surface and display image shown in FIG. 10 are $L_2$ and $l_2$, respectively. Therefore, the image may be written from the location which is apart from the front end of the display surface by only the distance of $(L_2-l_2)$. In this embodiment, in order to obtain the distance $(L_2-l_2)$, the number of scanning operations in the main scanning direction is counted. Namely, assuming that the main scan is performed $P_m$ times per one millemeter, the number of main scanning operations from the front end of the display surface to the image writing location will be $$N_p=(L_2-l_2)\times P_m \text{ (fractions are omitted).}$$

Practically speaking, after the signal HP (see FIG. 4) indicative of the front end portion of the display surface was detected, the laser beam detection signal BD in the main scanning direction M is counted, and the location when the count value becomes $N_p$ is set to the location where the writing of the image should be started.

The write timimg of the image in the main scanning direction M is determined as follows.

With respect to the writing location of the image in the main scanning direction M, the operation to determine the write timing is started from the time when the scan reaches the writing location in the sub-scanning direction S. In order to obtain the write timing of the image in the sub-scanning direction S, in this embodiment, an image clock VCLK synchorinized with the image data (refer to FIG. 9) is counted. The signal VCLK is sent from the external machine together with the video signal and it is counted synchronously with the signal BD indicative of the start of the main scan.

Assuming that the lengths in the main scanning direction M of the display surface and display image are respectively $L_1$ and $l_1$ and the pixel density in the main scanning direction M is $P_s$/mm, the count value will be expressed by a value of $$N_5 = \frac{(L_1 - l_1)}{2} \times P_5 \text{ (fractions are omitted).}$$

Therefore, the location when the count value of the image clock signal becomes $N_s$ can be set to the location where the writing of the display image should be started. In response to this write timing, a command to allow an external machine (not shown) to output an image data of one main scan is generated. By repeatedly performing the above-mentioned operations until the desired image data has been completely transmitted, the rear end of the display image A can be made coincident with the rear end of the display surface B. Now, as shown in FIG. 9, the signal BD is counted by the sequence controller 70 in order to obtain the delay time in the sub-scanning direction S. In addition, in response to an $N_s$ count start signal $N_{sst}$ which is sent from the sequence controller 70, the counting of the $N_s$ counter 90 (the counter to obtain the delay time in the main scanning direction M) is started. The data representative of the count number "$N_s$" is preset by the $N_s$ data from the sequence controller 70. Upon completion of a predetermined counting, a signal $H_{sync}$, to request the image data of one main scan is outputted to the external machine from the $N_s$ counter 90.

Figure 11:
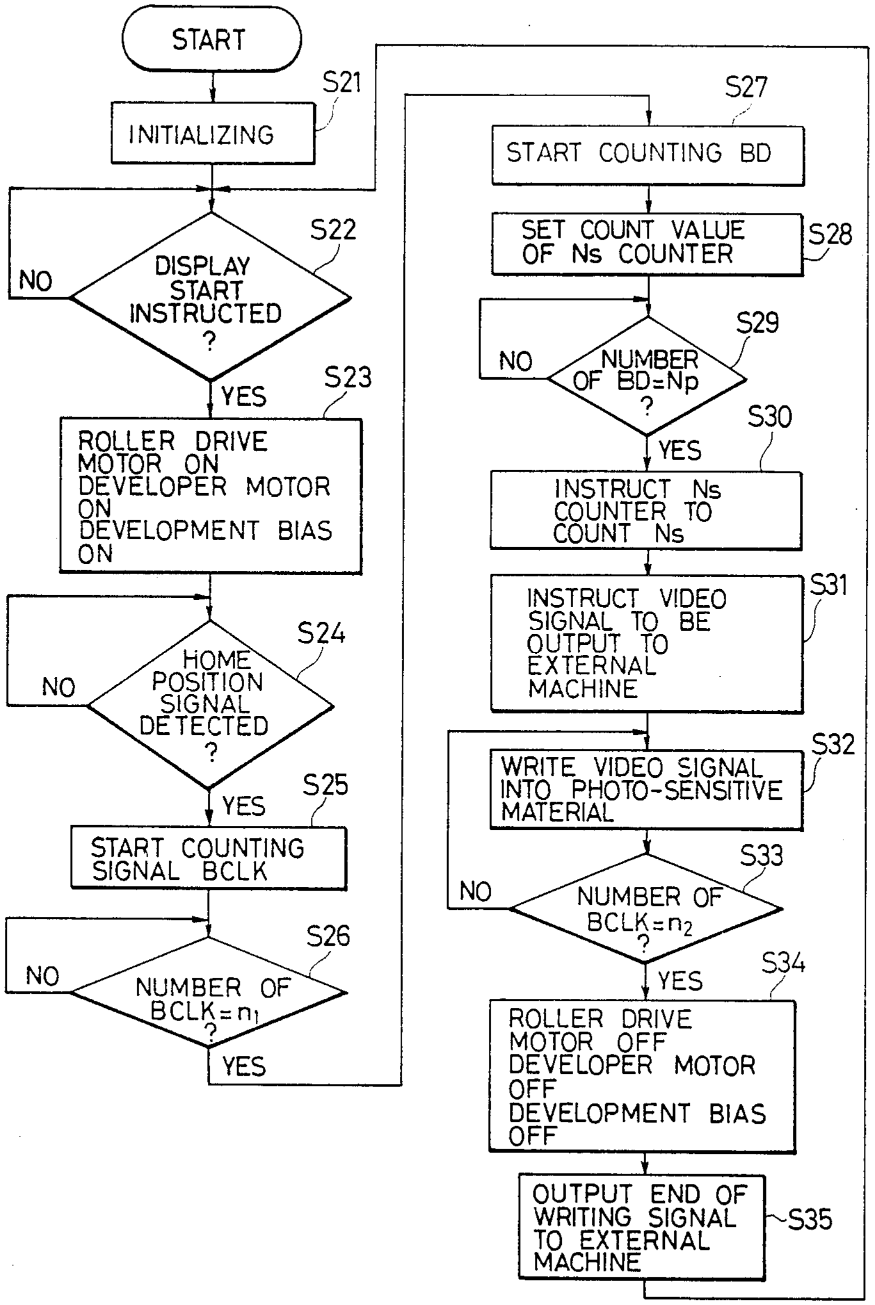
FIG. 11 is a flow chart showing the control procedure for the circuit of FIG. 9.
Figure 12:
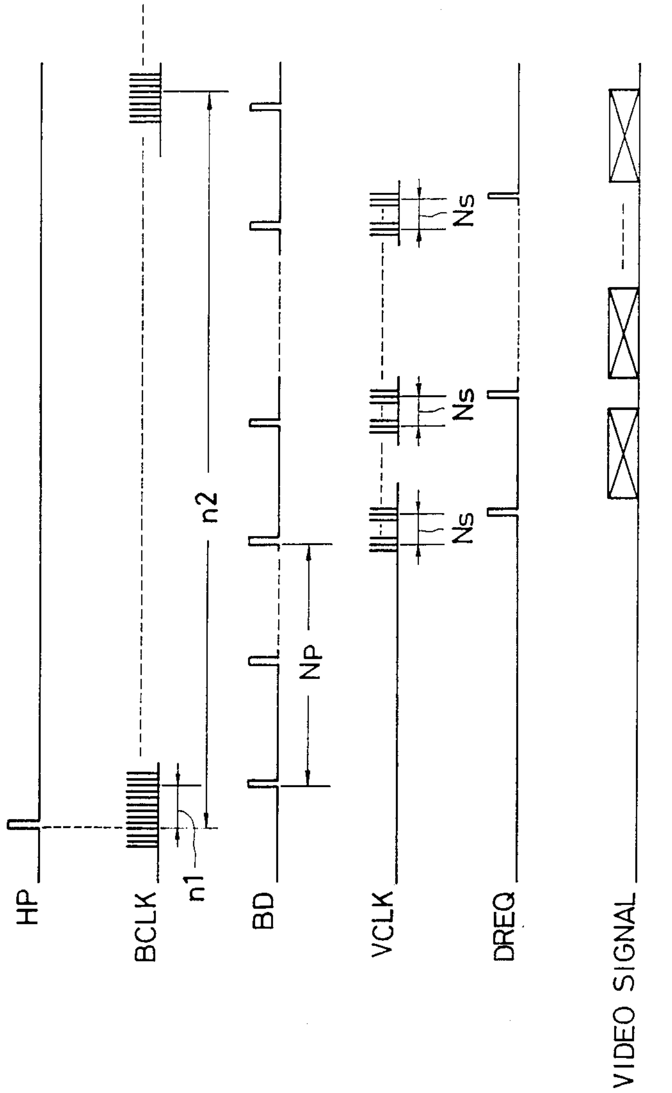
FIG. 12 shows time charts for principal signals in FIG. 9.

Next, the control operation of the sequence controller 70 shown in FIG. 9 will be described with reference to a flow chart of FIG. 11.

First, after the power supply was turned on, in step S21, the respective driving sections 72, 74 and 16 are initialized and the initialization processings such as a diagnosis of abnormality of each section and the like are performed.

Thereafter, in step S22, a check is made to see if the display start command from the operation panel 3 was generated or not while observing the key input from the operation panel 3 and the interface signal with the external machine.

When it is determined that the display start command was generated, the operation advances to next step S23, so that the roller drive motor 72 is driven to start the rotation of the photosensitive material 9, and the developer motor 74 is driven and a development bias voltage is applied to the developer 16, thereby enabling the image to be written into the photosensitive material 9.

Subsequently, in step S24, a check is made to see if the home position signal HP which is outputted from the home position sensor 63 in correspondence to the rotational location of the photosensitive material 9 was generated or not. When the signal HP is detected, next step S25 follows and the counting of the belt clock signal BCLK which is supplied from the belt clock sensor 56 is started.

Since the signal HP indicates the reference position of the display page section, the location when the count number of the signal BCLK reaches the predetermined value n1 after the signal HP was received becomes the location where the writing of the image should be started. Thus, in next step S26, the count number of the signal BCLK is checked to see if it reached the predetermined value n1 or not. When the count number became n1, in step S27, the counting of the signal is started to obtain the write timing in the main scanning directin M. In step S28, the count value of the $N_s$ counter 90 is set by the $N_s$ data.

In step S29, a check is made to see if the count number of the signal BD reached $N_p$ or not. When the count number became $N_p$, the $N_s$ count start command is sent to the $N_s$ counter 90 in step S30.

Thereafter, in step S31, the transmission command signal DREQ to instruct the transmission of the video signal is sent to an external machine.

In response to the transmission of the transmission command signal DREQ, in step S32, the video signal synchronized with the sync signal $H_{sync}$ is transmitted from the external machine. The laser driver 77 and laser oscillator 11 are driven and controlled on the basis of the video signal, so that the writing of the image into the photosensitive material 9 is started.

The counting of the signal BCLK is continuously executed also during this writing operation. In step S33, a check is made to see if the count number of the signal BCLK reached the predetermined value n2 or not.

When the count number of the signal BCLK became n2, it is determined that the write processing in the page section ended, so that the processing advances to next step S34. In this step, the roller drive motor 72 is stopped, the developer motor 74 is stopped and the output of the development bias voltage is stopped. Next, in step S35, the end of writing signal representing that the writing of the designated page section ended is sent to the external machine.

In this state, the image written into the photosensitive material 9 is displayed in the observation hole 2. After the end of display, the processing returns to step S22 and the above-described processings are repeated in response to the display start command.

Figure 13:
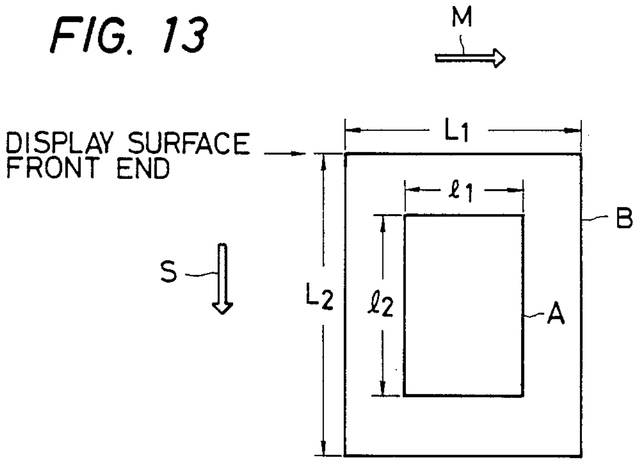

In addition, in the above arrangement, as shown in FIG. 13, in order to always display the image A at the center of the display surface B, the write timings of the image may be appropriately determined with respect to the respective main and sub-scanning directions in the similar manner as above.

The write timing of the image in the subscanning direction S is determined as follows.

Namely, the image may be written from the location which is apart from the front end of the display surface by only the distance of $(L_2-l_2)/2$. Therefore, in this embodiment, to obtain the distance of $(L_2-l_2)/2$, the number of scanning operations in the main scanning direction is counted. Namely, assuming that the main scan is performed $P_m$ times per one millimeter, the number of main scanning operations from the front end of the display surface to the image writing location will be $$N_p=((L_2-l_2)/2)\times P_m \text{ (fractions are omitted).}$$

Practically speaking, the laser beam detection signal BD in the main scanning direction M is counted after the signal HP indicative of the front end portion of the display surface (refer to FIG. 9) was detected. The location with the count value became $N_p$ is set to the location where image should be written.

The write timing of the image in the main scanning direction M is determined by a method similar to that described above.

A third embodiment will then be explained.

Figure 14:
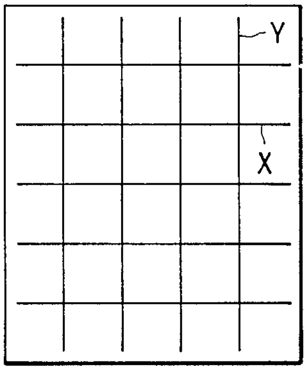
FIG. 14 is a diagram showing an example of a coordinate pattern which is displayed so as to be superimposed into the image display section.

FIG. 14 is a diagram showing an example of a coordinate pattern which is displayed on the display surface according to the invention. In this embodiment, both vertical lines Y and horizontal lines X are indicated by solid lines; however, the coordinates may be indicated by broken lines or numerals, or the like.

Figure 15:
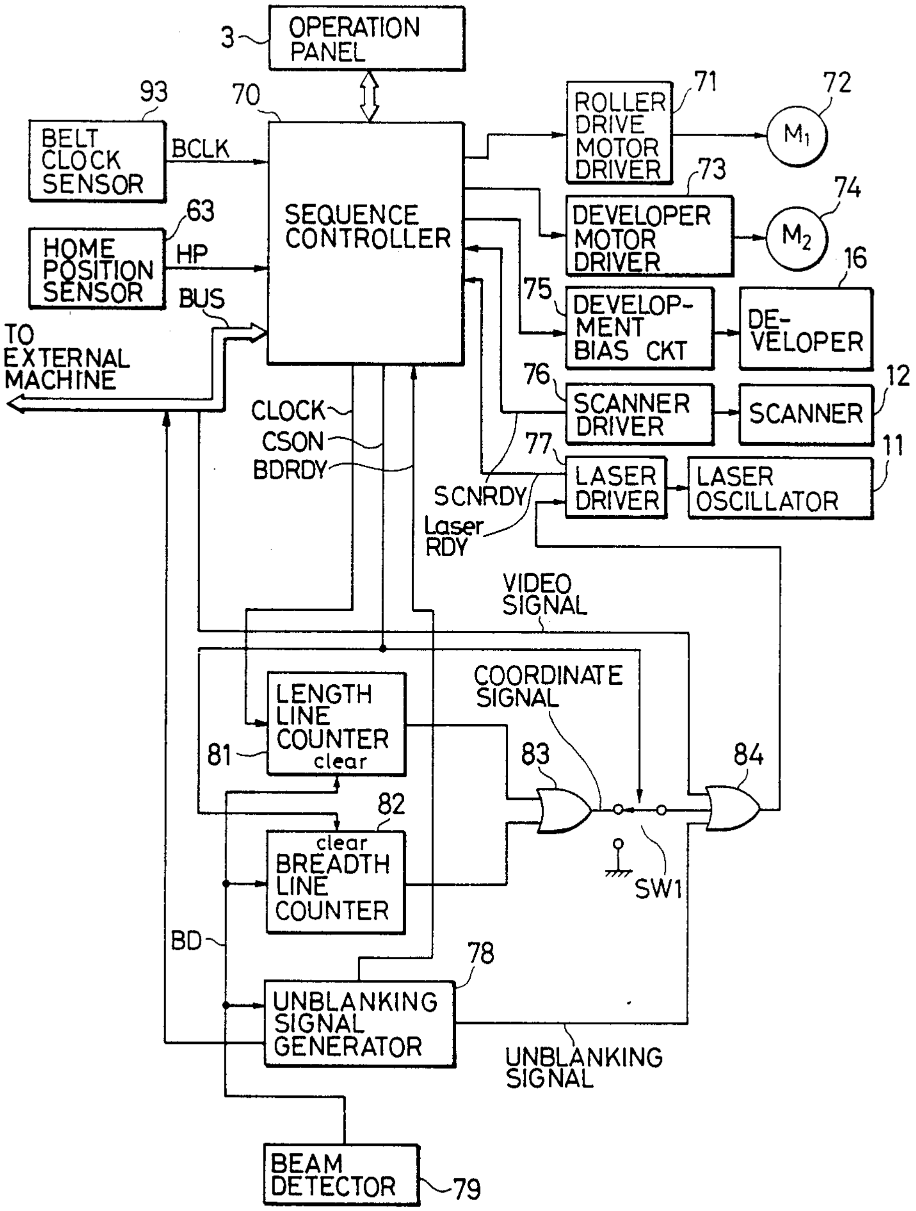
FIG. 15 is a block diagram showing an embodiment of an image display apparatus to which the present invention is applied.

In one embodiment to which the present invention was applied, the coordinates are indicated by the orthogonal straight lines consisting of the vertical and horizontal lines and its practical circuit arrangement is shown in FIG. 15.

FIG. 15 is a block diagram showing one embodiment of the image display apparatus shown in FIG. 8, in which the same parts and components as those shown in the second embodiment are designated by the same reference numerals and their detailed descriptions are omitted.

Figure 16:
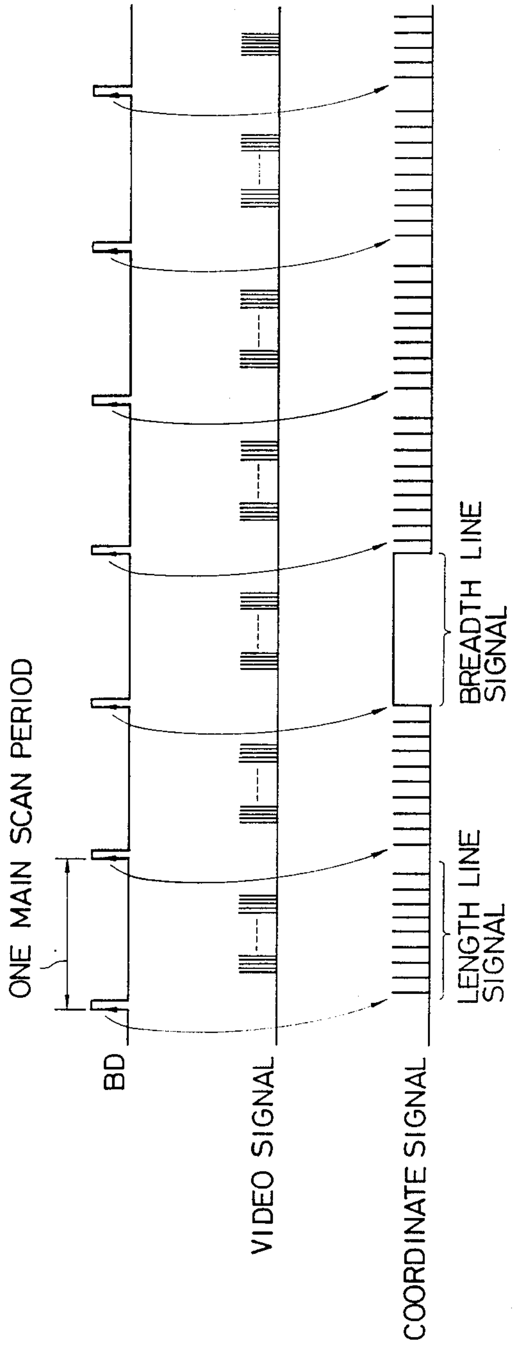
FIG. 16 shows timing charts for explaining the operation of the apparatus shown in FIG. 15.

To produce a signal (coordinate signal) for displaying the orthogonal straight lines of vertical and horizontal lines, this embodiment has a constitution consisting of a length line counter 81, a breadth line counter 82 and an OR gate 83. The coordinate signal together with the above-mentioned unblanking signal and video signal is supplied to the laser driver 77 through a switch SW1 and an OR gate 84. FIG. 16 shows timing charts for explaining the operational principle of such an arrangement. The length line counter 81 serves to generates a length line signal on the display surface and starts the counting operation after it was cleared by the signal BD. Therefore, the counting operation is repeated for every main scan. A fundamental clock for the length line counter 81 is supplied from the sequence controller 70 and its period is faster than a fundamental clock of the image data. Thus, it is possible to obtain the same line width as the minimum pixel which can be displayed; furthermore, lines of wider widths can be also derived. This length line counter 81 is constituted such that it outputs a pulse for every constant count value and starts outputting a pulse synchronously with the signal BD for every main scanning period.

This pulse drives the laser driver 77 through the OR gate 84 and allows the laser beam to be generated from the laser oscillator 11. By repeating this operation for every main scan, the length lines are formed on the display image.

The breadth line counter 82 uses the signal BD as the fundamental clock and sends for every predetermined counting of the signal BD a signal for generating the laser beam over the whole region of one main scan. In response to this signal, the laser driver 77 is driven, so that the breadth lines are formed on the display image. When the laser beam is emitted for one main scanning interval, the breadth line counter 82 is cleared in response to a signal CSON outputted from the sequence controller 70, so that the breadth line is always displayed at the same location on the image.

The coordinate signal shown in FIG. 16 is the OR of the pulse signals which are sent from the length and breadth line counters 81 and 82. An OR signal of the coordinate signal, video signal which is sent from the external machine and unblanking signal is sent to the laser driver 77. Thus, the image to which the orthogonal straight lines consisting of the vertical and horizontal lines shown in FIG. 14 were added is displayed. Further, a selection regarding whether the coordinate signal is displayed or not can be made by use of a coordinate display instruction switch (not shown) equipped on the operation panel 3. The sequence controller 70 outputs the signal CSON in accordance with the input of this switch to change over the switch SW1, thereby controlling the transmission of the coordinate signal.

On the other hand, orthogonal straight lines having arbitrary intervals can be derived if the apparatus is constituted such that the timings when the length and breadth line counters 81 and 82 output the signals can be arbitrarily changed by the operation panel 3.

Figure 17:
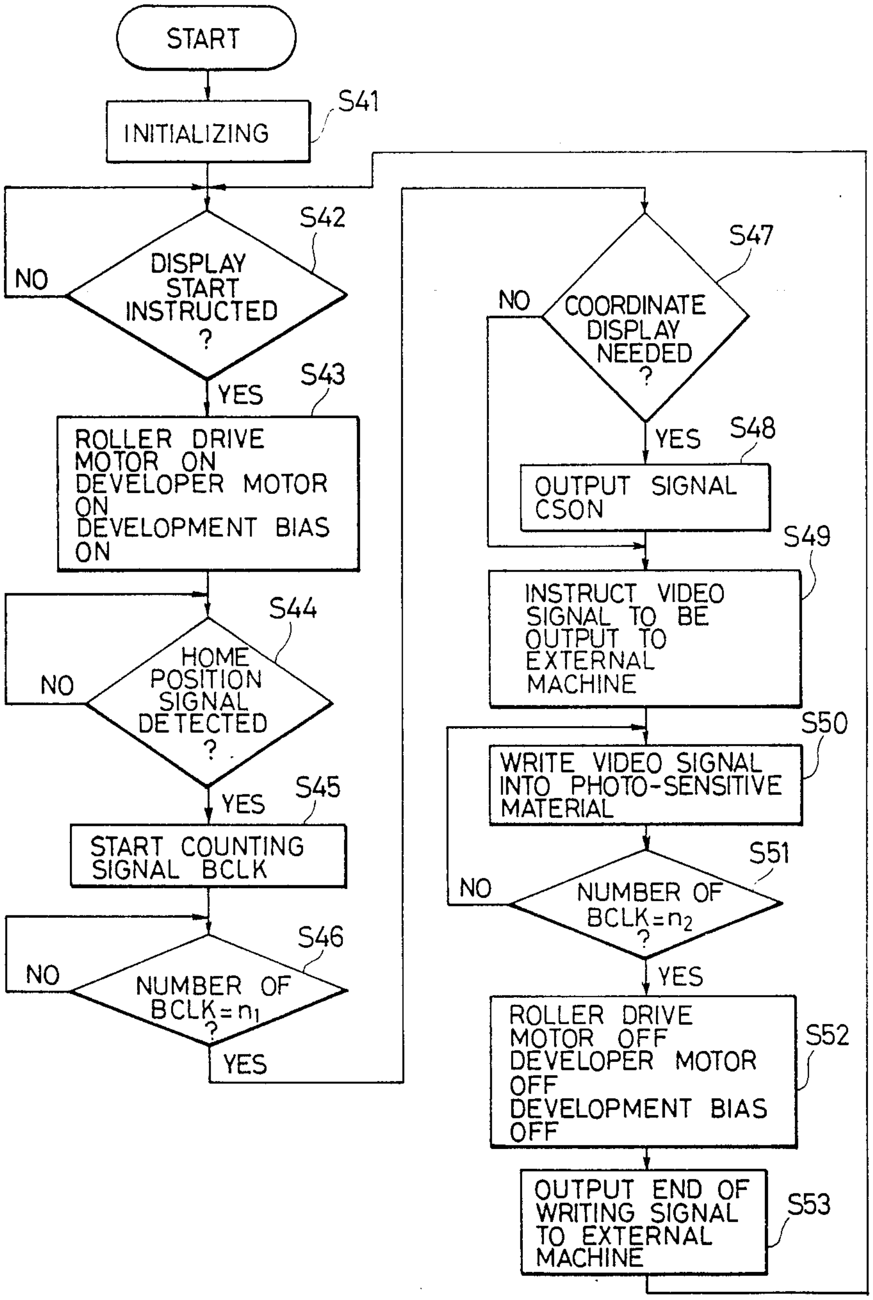
FIG. 17 is a flow chart showing the control procedure for the circuit of FIG. 15.

Next, the control procedure for the sequence controller 70 shown in FIG. 15 will be described with reference to a flow chart of FIG. 17.

First, after the power supply was turned on, in step S41, the respective driving sections 72, 74 and 16 are initialized and the initialization processings such as a diagnosis of abnormality of each section and the like are performed.

Thereafter, in step S42, a check is made to see if the display start command was generated or not from the operation panel 3 while observing the key input from the operation panel 3 and the interface signal with the external machine.

When it is determined that the display start command was generated, next step S43 follows, in which the roller drive motor 72 is driven to start the rotation of the photosensitive material 9, and the developer motor 74 is driven and the development bias voltage is applied to the developer 16, thereby enabling an image to be written into the photosensitive material.

Subsequently, in step S44, a check is made to see if the home position signal HP from the home position sensor 63 which is outputted in correspondence to the rotational location of the photosensitive material 9 was generated or not. When the signal HP is detected, the processing advances to next step S45 and the counting of the belt clock signal BCLK which is supplied from the belt clock sensor 93 is started. The signal HP indicates the reference location of the display page section. Therefore, the counting of the signal BCLK is started from the time when the signal HP was received. The location when the count number reached the predetermined value n1 is set to the location where the writing of the image should be started. In next step S46, the count number of the signal BCLK is checked to see if it reached the predetermined value n1 or not.

When the count number reached $n_1$, a check is made to see if the coordinate display is needed or not in step S47. If the coordinates are displayed, in step S48, the signal CSON is outputted to initialize the breadth line counter and to set the switch SW1. Thereafter, in step S49, the transmission command signal DREQ to instruct the transmission of the video signal is sent to the external machine through the BUS.

In response to the transmission of the transmission command signal DREQ, the sync signal $H_{sync}$ is sent to the external machine after a constant time interval elapsed. In step S50, the video signal synchronized with the sync signal $H_{sync}$ is transmitted from the external machine. In response to the video signal, the laser beam is driven and controlled and the writing of the image into the photosensitive material 9 is started. The counting of the signal BCLK is also continuously executed during this writing operation. In step S51, the count number of the signal BCLK is checked to see if it reached the predetermined number n2 or not. When the count number of the signal BCLK reached n2, it is determined that the write processing into the page section ended and next step S52 follows. In this step, the roller drive motor 72 is stopped, the developer motor 74 is stopped and the output of the development bias voltage is stopped. Next, in step S53, the end of writing signal representing that the writing into the designated page section ended is sent to the external machine. In this state, the image written into the photo sensitive material 9 is displayed in the observation hole 2 and after the end of display, the processing returns to step S42 and the above-described processings are repeated in accordance with the display start command.

A fourth embodiment will then be explained.

Figure 18:
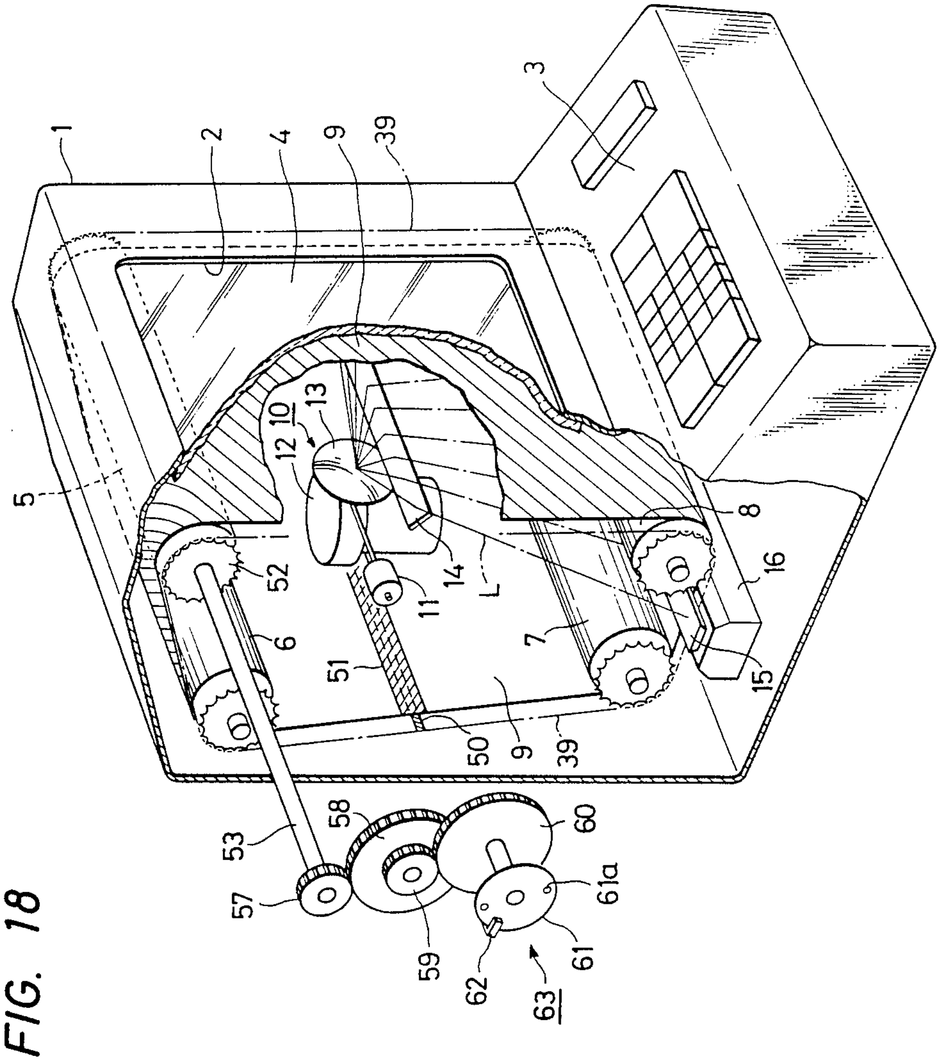
FIG. 18 is a perspective view with a part cut away, illustrating an example of an arrangement of the image display apparatus of the invention.

FIG. 18 shows an example of an arrangement of the image display apparatus of the present invention, in which the same parts and components as those shown in the conventional example and foregoing embodiments are designated by the same reference numerals. In FIG. 18, a numeral 50 denotes the plate stay to couple the photosensitive material 9 with the two chains 39. This stay is attached at the location such as, e.g., the junction 51 of the photosensitive material 9 or the like. The rotation of the drive roller 5 coupled to the drive motor $M_1$ (not shown) is transferred to the chains 39 which are in engagement with the sprocket wheels 52 attached to both ends of the roller 5 and to the photosensitive material 9 coupled to the chains 39. Thus, the photosensitive material 9 is rotated in association with the rotation of the drive roller 5.

On the other hand, the number (desired link number) N of the engaging portion of the chain 39 is set to be a common multiple between the number Z of teeth of the sprocket wheel 52 and the number P of pages of the image which can be displayed when the photosensitive material 9 rotates once. For example, in the case where the number Z of teeth of the sprocket wheel 52 is "25" and the number P of pages is "2", the number N of the engaging portion of the chain 39 is set to "200". Thus, this makes it possible to always hold the constant correspondence relationship among the locations of teeth of the sprocket wheels 52, the location of the photosensitive material 9, and the page display location on the photosensitive material 9.

A numeral 53 denotes the extension drive shaft which is formed by extending the rotary shaft of the drive roller 5. The series of gear train 57 to 60 which are driven by the rotation of the extension drive shaft 53 are provided. The circular light shielding plate 61 is fixed to the axial end of the gear 60. The photo encoder 63 which is used as the home position detecting means (home position sensor) of each page is constituted by the holes 61*a* formed in the circular light shielding plate 61 and the photo interrupter 62 which passes through the holes 61*a*. Consequently, a gear ratio G between the gear train 57 to 60 and the sprocket wheel 52 is set such that the light shielding plate 61 always rotates once for one rotation of the photosensitive material 9. For instance, in the case where the number Z of teeth is 25 and the number P of pages is 2 and the number N of the chain engaging portion is 200, when it is assumed that the gear ratio G is set to $\frac{1}{8}$, the light shielding plate 61 rotates once for every rotation of the belt 9. Thus, this makes it possible to generate the home position detection signal of each page from the photo interrupter 62.

The roller 5 among the four rollers 5 to 8 is used as the drive roller to transfer the rotational force of the motor $M_1$ (not shown). A pulse encoder is equipped in the motor $M_1$ and is used as signal generating means (belt clock generating means) for obtaining the operation timing for every page. At least one of the other three rollers 6 to 8, e.g., the roller 6 acts as the belt tension roller to impart the tension to the belt 9. Thus, when the drive roller 5 is rotated counterclockwise in FIG. 2 by the motor $M_1$, the belt 9 rotates counterclockwise without slack and slip. In association with this rotation, the outer surface of the belt 9 moves and passes from the bottom to the top at the portion of the display image observation hole 2 between the rollers 5 and 8.

On the other hand, in the image exposing apparatus 10, the laser intermittent beam L corresponding to the serial electronical pixel signal which is supplied from an electronic computer, image readout apparaus or the like is generated from the semiconductor laser oscillator 11 disposed in the front portion of the drawing toward the rotating polygonal mirror scanner 12 disposed in the rear portion of the drawing. The laser beam L which entered the scanner 12 is deflected in the direction of width of the belt and passes through the path of the f·θ lens 13, reflecting mirror 14 and transparent plate 15. Then, the laser beam L enters the inner surface side of the belt 9 between the rollers 7 and 8 and scans in the direction of the belt. Thus, the image is exposed by the laser beam from the inner surface side of the belt whereby the laser beam scan is used as the main scan and the rotational movement of the belt 9 is used as the sub-scan.

First, after setting the desired conditions such as the instruction to input image information, designation of the image display location and the like by means of the operations of the buttons arranged on the operation panel 3, when the display start command is inputted by the key, the belt 9 as the photosensitive material starts rotating at a preset velocity. Next, the laser beam scan exposure of the image information which was inputted from a reader, disk or the like is started on the inner surface side of the belt 9 between the rollers 7 and 8. Since the toner of the developer 16 acts on the outer surface of the belt simultaneously with this exposure, the toner images corresponding to the exposed images are sequentially formed on the outer surface of the belt 9. When the toner image formed on the belt outer surface rotates and moves from the bottom to the top at the portion of the display image observation hole 2 in association with the rotational movement of the belt 9 and reaches the location within the designated range of the observation hole, the rotation of the belt 9 is once stopped. Thus, the input image is displayed in the observation hole 2 and the image is observed through the display window glass 4. Next, when the belt 9 is rerotated by the belt rerotation command, the toner image corresponding to the next input image is formed by a processing similar to that described above. This toner image moves to the location within the observation hole range, so that the next image is displayed. When the toner image on the outer surface of the belt after completion of the image display again reaches the section of the toner developer 16 in association with the rotation of the belt, it is cleaned and removed by the developing brush 35. The photo sensitive material 9 is newly subjected to the exposure simultaneous development immediately after the cleaning, so that a new toner image is formed.

In this way, the image information is reproduced and displayed as the toner image and the image exposure is carried out by use of the extremely thin laser beam L; therefore, it is possible to display the image with high resolution in which thin characters and images can be clearly displayed so as to easy to see. At the same time, since the exposure simultaneous toner developing method is adopted, it is possible to relatively cheaply manufacture the image display apparatus with a large display surface and an extremely simple constitution without requiring corona charging means or any particular cleaning means. Also, it is possible to constitute the display apparatus with high reliability but less failure and less degradation in photosensitive material.

Figure 19:
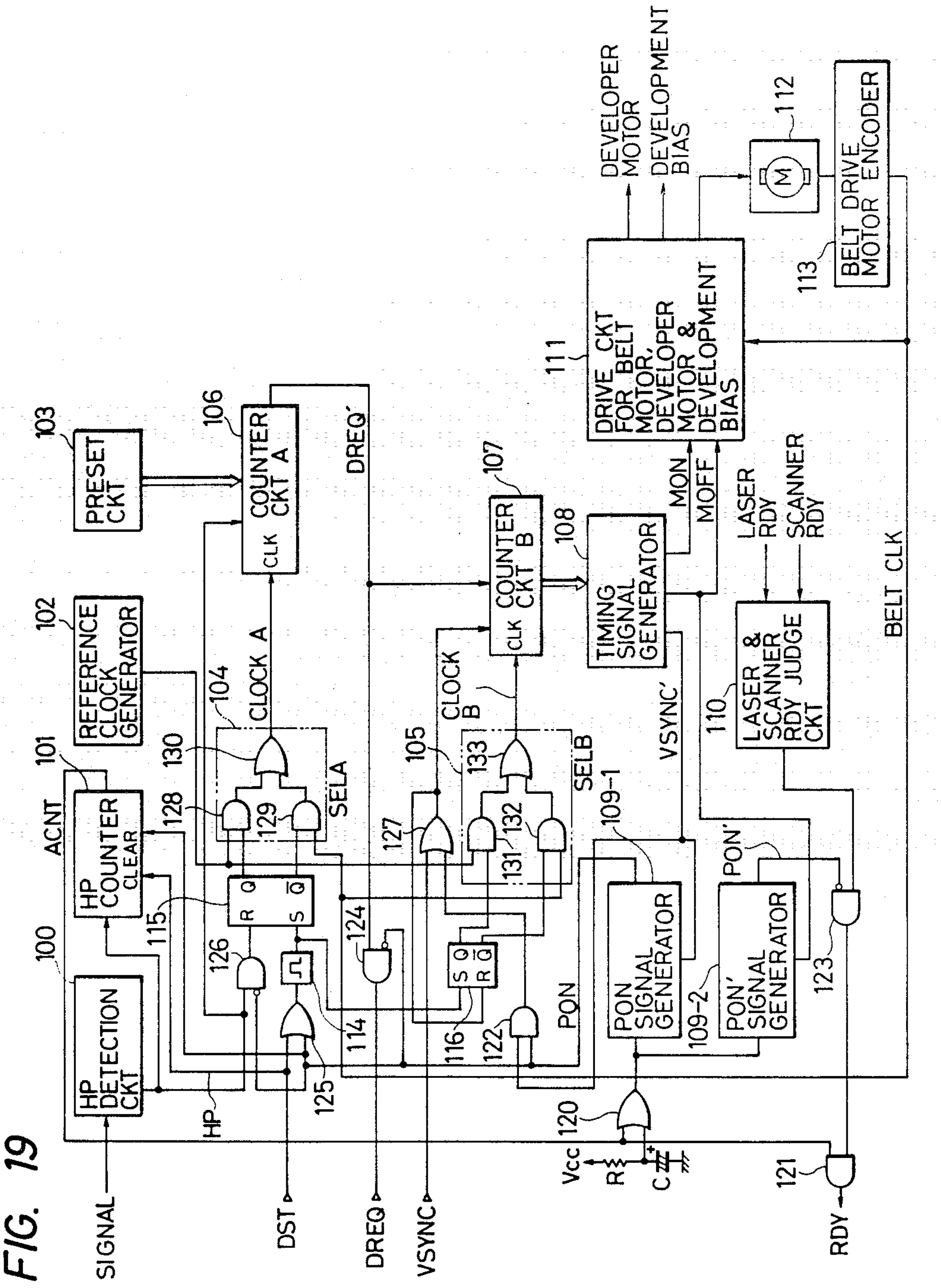
FIG. 19 is a block diagram showing an example of an arrangement of the control section of the apparatus of FIG. 18.
Figure 20:
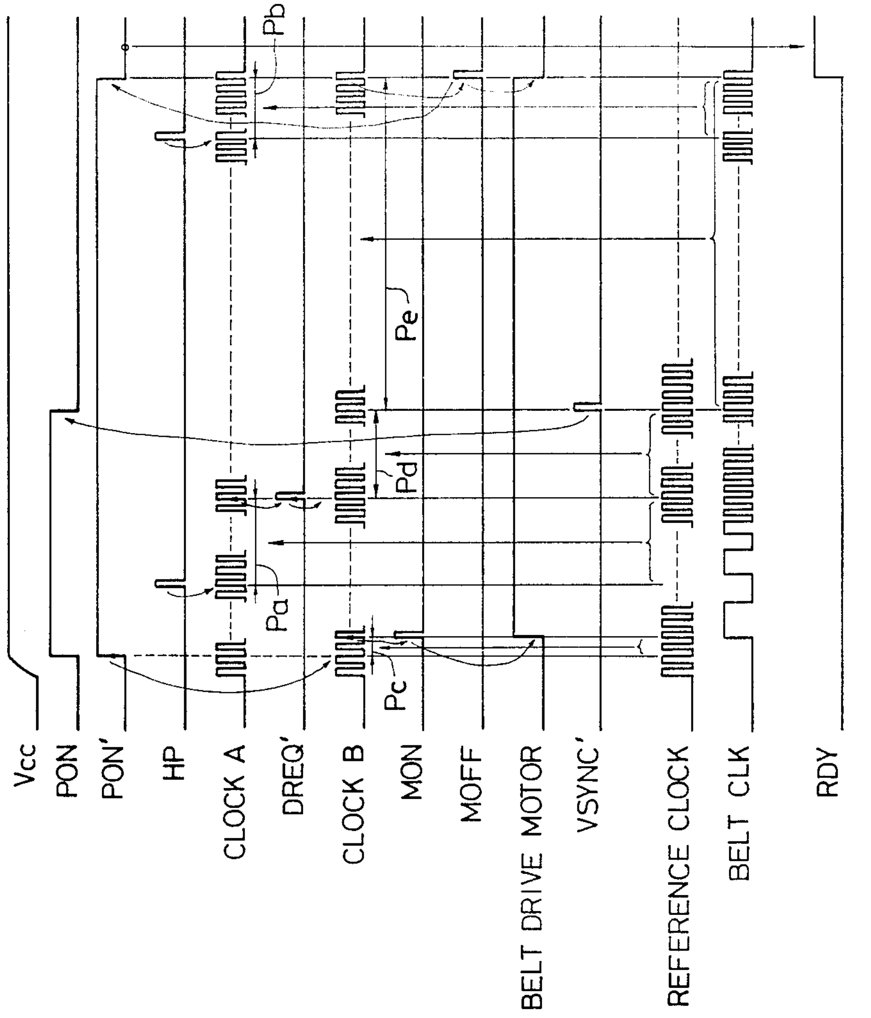
FIGS. 20, 21 and 22 are time charts showing the operation of the control section of FIG. 19.
Figure 21:
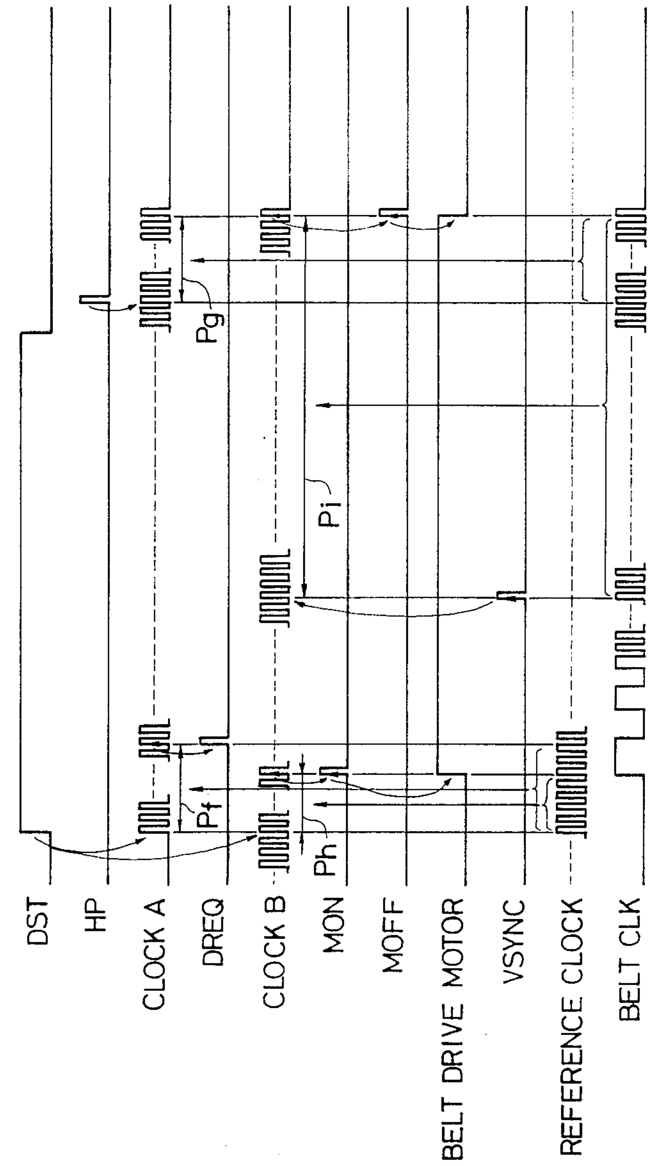
Figure 22:
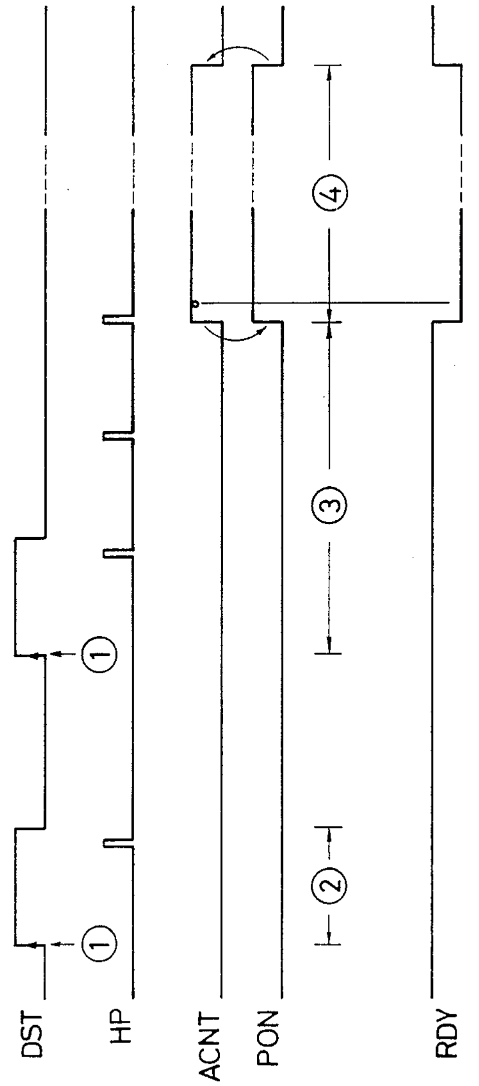

Therefore, in this embodiment, the above-described endless belt-like image display apparatus (hereinbelow, referred to as a soft display) and an image readout apparatus or an electronic file (not shown) are combined; the image signal obtained by the image readout apparatus or electronic file is received by the soft display; and this image signal is converted to the visible image and is displayed. FIG. 19 shows a block diagram of the sequence control section of the soft display. FIGS. 20, 21 and 22 are detailed timing charts for this sequence control section.

The sequence control section shown in FIG. 19 mainly comprises a counter circuit A 106 and a counter circuit B 107. By respectively counting the clocks A and B, the counter circuits A and B output desired signals at proper timings. Each of clock selecting circuits (SELA, SELB) 104 and 105 selects either one of the reference clock or belt clock (BELTCLK) from a reference clock generator 102 which uses a well-known oscillator at an appropriate timing. The clock selecting circuits 104 and 105 input the selected clocks as a clock A and a clock B to the respective counter circuits. The clock BELTCLK is the clock which is outputtwed from a pulse encoder 113 equipped in a motor 112 to drive the belt 9. A preset circuit 103 produces a preset value of the counter circuit A 106 and has a well-known constitution. The count value of the counter circuit B 107 to count the clock B is inputted to a timing signal generator 108. The generator 108 outputs either one of VSYNC', MON and MOFF signals in response to this count value. The VSYNC' signal is the false signal of a VSYNC signal which is outputted for every page of the image information. This false signal is outputted only when the power supply is turned on. The MON and MOFF signals are the signals to control the driving of a belt motor driver, a developer motor driver and a development bias circuit (which are not shown). The MON and MOFF signals are inputted to a drive circuit 111 to drive the respective driving sections of the soft display. This drive circuit 111 drives the belt drive motor, developer motor and development bias circuit. By feeding back a signal from the pulse encoder 113 equipped in the belt drive motor 112 to the drive circuit 111, the speed of the motor 112 is controlled so as to rotate at a constant speed.

A numeral 110 denotes an RDY judge circuit for detecting the ready states (hereinafter, referred to as RDY states) of the semiconductor laser oscillator (indicated at 11 in FIG. 18) and polygonal mirror scanner (at 12 in FIG. 18) which are used in the soft display. The RDY state of the laser oscillator 11 is judged by the fact that the laser oscillator lies within a predetermined temperature range. The RDY state of the polygonal mirror scanner 12 is judged by the fact that the scanner is rotating at a predetermined rotating speed. In addition, when the laser oscillator 11 and scanner 12 are in the RDY states, the signals are respectively outputted to the RDY judge circuit 110.

A numeral 100 indicates a circuit to output an accurate pulse by shaping the waveform of the HP signal detected by the home position (hereinbelow, referred to as HP) sensor (indicated at 63 in FIG. 18), and 101 is an HP counter to count the HP signal. The abnormality which occurs when the photosensitive belt 9 was continuously driven under some abnormal condition or the like is detected by this count value. Numerals 109-1 and 109-2 are a PON signal generator and a PON' signal generator which are triggered when the power supply is turned on or by an ACNT signal representative of the abnormal operation of the photo sensitive belt 9 which was detected by the HP counter 101, and then those generators output the signals. A numeral 114 is a pulse generator consisting of a one-shot multivibrator. This pulse generator generates a pulse when a PON signal or a DST signal is inputted, thereby setting R-S flip flops 115 and 116 for a constant time intervals. Numerals 120 to 133 are logic gates.

The practical operation of the sequence control section will now be explained hereinbelow with reference to timing charts of FIGS. 20, 21 and 22.

The operation of the sequence control is mainly divided into two operations: the operation when the power supply is turned on; and the ordinary operation when the image signal is being received from the readout apparatus or electronic file. FIG. 20 shows the timing chart when the power supply is turned on. When the power supply is turned on, the soft display prerotates in order to clean the photosensitive material belt 9 and to stop it at a predetermined location. When the laser oscillator 11 and scanner 12 become the drivable states after the end of prerotation, an RDY signal indicating that the soft display is ready is outputted to the image readout apparatus. In the diagram, $V_{cc}$ denotes a power supply voltage. When the $V_{cc}$ is applied, the signals are inputted to the PON signal generator 109-1 and PON' signal generator 109-2 through the gate 120 after the elapse of the time interval until the power supply voltage becomes stable due to the delay effect by a resistor R and a capacitor C in FIG. 19, so that the PON and PON' signals are outputted. The pulse generator 114 is turned on through the gate 125 in response to the leading edge of the PON signal, causing the flip flops 115 and 116 to be set. Each Q output becomes an H level and the gates 128 and 131 are turned on, so that the reference clock generated from the reference clock generator 102 is selected and outputted as the clocks A and B.

When the clock B is inputted to the counter circuit B 107, the counter circuit B 107 starts counting. When the $P_c$ clocks B are counted, the timing signal generator 108 outputs the MON signal to the drive circuit 111, thereby starting the driving of the belt drive motor.

As the result of this operation, the rotation, i.e., the prerotation of the photo sensitive material belt begins. Thereafter, when this belt rotates by a certain distance, the HP signal is outputted from the photo encoder 63. This HP signal is detected by the HP detection circuit 100. In response to this detection, the preset value from the preset circuit 103 is loaded in the counter circuit A 106 and the counter circuit A 106 starts the counting operation. At this time, the clock A becomes the reference clock as mentioned previously. When the $P_a$ clocks A ($P_a$ is equal to the preset value) are counted, a DREQ' signal is outputted. This DREQ' signal is the false signal of the DREQ signal to request for the readout apparatus or electronic file to output image information. This false signal is needed during the prerotation since no image is displayed. The DREQ signal is inputted to the counter circuit B 107, so that the count value till then is reset and the counting is newly started.

At this time, the clock B is the reference clock similar to the foregoing state. After the counter circuit B 107 counted the $P_d$ clocks B, the VSYNC′ signal is outputted from the timing signal generator 108. The gate 122 is turned on in response to the VSYNC′ signal, causing the flip flop 116 to be reset through the gate 127. Since the Q output of the flip flop 116 becomes an L level (therefore, the gate 131 is turned off) and the $\overline{Q}$ output becomes an H level (therefore, the gate 132 is turned on), the belt clock from the belt drive motor encoder 113 is selected. This belt clock is outputted as the clock B to the counter circuit B 107 through the gate 133. At the same time, the counter circuit B 107 is reset through the gates 122 and 127 in response to the VSYNC′ signal, so that the belt clock is newly counted. In addition, the VSYNC′ signal is inputted to the PON signal generator 109-1, thereby stopping the output of the PON signal. At this time, the rotation of the photo sensitive material belt is driven in the state whereby the rotating speed is constant after the start-up of rotation of the belt. The counting operation of the counter circuit B 107 is continued until the number of belt clocks (BELTCLKs) becomes $P_e$. When the $P_e$ belt clocks BELTCLKs are counted, the MOFF signal is outputted from the timing signal generator 108 to the drive circuit 111, thereby stopping the driving of the photosensitive belt 9. In addition, the MOFF signal is inputted to the PON′ signal generator 109-2 and stops the output of the PON′ signal. Since the soft display is constituted such that the HP signal is detected immediately before the photo sensitive belt stops, the HP signal is inputted to the counter circuit A 106 immediately before the MOFF signal is outputted. The counter circuit A 106 executes the loading of the preset value in response to the HP signal and starts the counting operation. At this time, the gate 126 is turned on by the HP signal and the flip flop 115 is reset, so that the clock A is switched from the reference clock to the belt clock (BELTCLK). Thus, the counter circuit A 106 counts the belt clock (BELTCLK).

This counting operation is interrupted since the belt clock (BELTCLK) cannot be obtained due to the stop of driving of the photo sensitive belt. Consequently, the count value of the counter circuit A 106 corresponds to the distance of movement of the photo sensitive belt after the HP signal was inputted. The above-mentioned operation is nearly similar to the ordinary operation in the case where the image information is displayed. A point different from the ordinary operation is that the signals DST and VSYNC which are sent from an image readout apparatus or electronic file are independently generated in the sequence control section and thereby allowing the prerotating operation to be executed.

In the prerotating operation, the PON′ signal is inverted and the RDY signal which informs to the image readout apparatus that the soft display is ready is made invalid. After completion of the prerotation, when the PON signal is not sent any more, the RDY signal is made valid.

Next, the sequence of the ordinary operation will be described with reference to FIG. 21. First, the signal DST indicative of the start of operation of the soft display is inputted to the soft display from the image readout apparatus or electronic file (not shown). The flip flops 115 and 116 are set in response to the DST signal, so that the counter circuits A 106 and B 107 simultaneously start the counting operations. At this time, both clocks A and B are the reference clocks. The count value of the counter circuit A 106 corresponds to the distance between the location when the HP signal was detected in the previous operation to the location where the photo sensitive belt stops as already described before in the operation sequence when the power supply is turned on. Assuming that the preset value is $P_{pre}$ and the count value until the photo sensitive belt stops after the detection of the HP signal is $P_B$ and the total count number of the counter circuit A 106 is $P_{full}$, the count number $P_f$ until the counter circuit A 106 outputs the DREQ′ signal (DREQ signal) after the DST signal was inputted will be $$P_f = P_{full} - (P_{pre} + P_B).$$

Therefore, the count value $P_f$ becomes smaller with an increase in the count value $P_B$, while the $P_f$ increases as the $P_B$ becomes smaller. This makes it possible to absorb a variation in location where the photo sensitive belt stops due to the inertia or a variation in time interval until the VSYNC signal indicative of the front end of the image signal is inputted to the soft display after the generation of the DREQ signal to request for the image readout apparatus to output the image signal. Namely, in the case where the distance from the location when the HP signal indicative of the absolute position on the photo sensitive belt 9 was generated to the location where the photo sensitive belt stops is short, the timing when the DREQ signal is outputted after the DTS signal was inputted is delayed. In contrast, when such a distance is long, by quickening the output timing of the DREQ signal, the accumulated error of the shift amounts of the location where the photo sensitive belt 9 stops is eliminated, thereby allowing the joint of the belt 9 to be always positioned in the region out of the effective image range.

The counter circuit B 107 counts the reference clock of which the clock B was selected by the DST signal and when the count value becomes $P_h$, the MON signal is outputted from the timing signal generator 108, so that the driving of the photo sensitive belt is started. Thereafter, the counter circuit B 107 is reset and restart the counting operation by the VSYNC signal which is sent from the image readout apparatus after the elapse of a constant time interval in response to the DREQ signal. The clock B at this time is the BELTCLK because the flip flop 116 is reset by the VSYNC signal. After the counter circuit B 107 completely counted the $P_i$ clocks BELTCLKs corresponding to the effective image region, the timing signal generator 108 generates the MOFF signal to stop the photo sensitive belt. This operation enables the constant positional relationship to be always held between the image display location and the display surface. The counter circuit A 106 loads the preset value and counts the clock BELTCLK in response to the HP signal which was detected immediately before the photo sensitive belt stops. As described above, when the belt 9 stops, the counter circuit A 106 holds the count value corresponding to the running distance of the belt 9 until the belt 9 stops after the detection of the HP signal. Next, means for detecting the abnormal operation of the photo sensitive belt 9 by the HP counter 101 and the processing thereof will be explained. Description will be made with respect to the detecting and processing means in the case where the photo sensitive belt 9 was continuously driven due to some causes of noise and the like. FIG. 22 shows timing charts in case of the abnormal operation.

The HP counter 101 is cleared by the leading edge of the DST signal which is sent from the image readout apparatus (indicated at ① in FIG. 22). After this clearing operation, the HP signal detected is counted. In this embodiment, when the count value becomes three, it is determined that the abnormal operation occurs in the photo sensitive belt 9 (③ in FIG. 22), thereby detecting the abnormality. When this abnormality is detected, the HP counter 101 then outputs the ACNT signal to the PON' signal generator 109-2 through the gate 120. In response to the PON' signal, the RDY signal which is outputted to the image readout apparatus is made invalid, thereby informing to the image readout apparatus that the soft display is disabled. The PON signal generator 109-1 and PON' signal generator 109-2 receive the ACNT signal and then carry out the sequence control to perform the processing, i.e., the prerotation processing (④ in FIG. 22) which is equal to foregoing processing when the power supply is turned on. Namely, by executing the prerotation processing when the power supply is turned on, the operation to stop the rotation caused due to the abnormal operation of the photo sensitive belt 9 at a proper location is executed. After the execution of the above processing, when the PON and PON' signals are canceled, the ACNT signal is also canceled simultaneously, so that the RDY signal is made valid. In addition, ② indicates that the apparatus is normally operating.

Although the present invention has been shown and described with respect to preferred embodiments, various changes and modifications which are obvious to a person skilled in the art to which the invention pertains are deemed to lie within the spirit and scope of the invention.

I claim:

1. Am image display apparatus comprising:
image holding material;
input means for inputting an image signal;
image forming means for forming an image on said image holding material in response to said image signal input by said input means;
a display section for displaying said image formed on said image holding material; and
control means for controlling said image forming means in response to the sizes of said display section and of said input image signal to display said image at a predetermined location of said display section.

2. An image display apparatus according to claim 1, further comprising generating means for generating clock pulses synchronized with input of said image signal, wherein said control means counts said synchronized clock pulses and controls said image forming means.

3. An image display apparatus according to claim 1, wherein said control means controls the timing to form the image of said image signal.

4. An image display apparatus comprising:
image holding material;
input means for inputting an image signal;
image forming means for forming an image on said image holding material in response to said image signal input by said input means;
a display section for displaying said image formed on said image holding material; and
adding means for adding a reference line indicating location to said image formed on said image holding material.

5. An image display apparatus according to calim 4, further including selecting means for arbitrarily selecting said adding means.

6. An image display apparatus comprising:
image holding material;
moving means for moving said image holding material;
input means for inputting an image signal;
image forming means for forming an image on said image holding material in response to said image signal input by said input means;
a display section for displaying said image formed on said image holding material;
detecting means for detecting a predetermined location of said image holding material; and
control means for controlling said moving means in order to prevent said predetermined location from being displayed on said display section.

7. An image display apparatus comprising:
image holding material;
drive means for moving said image holding material;
input means for inputting an image signal;
image forming means for forming an image on said image holding material in response to said image signal input by said input means;
a display section for displaying said image formed on said image holding material;
detecting means which detects a particular location of said image holding material and produces a pulse;
counter means for counting the output pulse produced by said detecting means;
output means for outputting an abnormal signal indicating an abnormal movement of said image holding material when the counted value by said counting means reaches a predetermined number; and
control means for preventing said image forming means from operating in response to said abnormal signal.

8. An image display apparatus according to claim 7, wherein said counter means is reset whenever said image holding means stops.

9. An image display apparatus comprising:
image holding material;
input means for inputting an image signal;
image forming means for forming an image on said image holding material in response to said image signal input by said input means;
a display section for displaying said image formed on said image holding material;
detecting means for detecting a particular location of said image holding material; and
control means for controlling said image forming means such that said image is prevented from being displayed on said particular location of said image-holding material.

10. An image display apparatus comprising:
image holding material;
driving means for moving said image holding material;
input means for inputting an image signal;
image forming means for forming an image on said image holding material in response to said image signal input by said input means;
a display section for displaying said image formed on said image holding material;
generating means for generating a series of pulses;
counter means for counting said pulses; and control means for controlling said drive means such that said image holding material stops in response to a value counted by said counter means after the input of a signal indicating the beginning of said image signal by said input means.

11. An image display apparatus according to claim 10, wherein said counter means is reset in response to said signal indicative of the start of the image information of one page.

12. An image display apparatus according to claim 10, wherein said pulses are synchronized with the movement of said image holding material.

13. An image display apparatus according to claim 1, wherein said control means controls said image forming means in order to display said image based on said image signal at the center of said display section.

14. An image display apparatus according to claim 1, wherein said control means controls said image forming means such that the end edge of said image based on said image signal coincides with the end edge of said display section.

15. An image display apparatus according to claim 4, wherein said reference line is arranged in the direction of the width of said display section.

16. An image display apparatus according toclaim 4, wherein said reference line is arranged in the direction of the length of said display section.

17. An image display apparatus according to claim 4, wherein said adding means adds a plurality of said reference lines.

18. An image display apparatus according to claim 17, wherein said adding means can adjust the distance between said reference lines.

19. An image display apparatus according to claim 6, further comprising generating means for generating pulses synchronized with the movement of said image holding material and counting means for counting said pulses, wherein said control means controls said moving means such that said image holding material is stopped in response to a value counted by said counting means after a detection of said predetermined location.

20. An image display apparatus according to claim 7, wherein said control means controls said driving means such that said image holding material stops in response to said abnormal signal.

21. An image display apparatus according to claim 9, wherein said control means controls the timing of the next image formation in response to the position where said particular location of said image holding material stops.

22. An image display apparatus according to claim 9, further comprising generating means for generating pulses synchronized with the movement of said image holding material and counter means for counting said pulses, wherein said control means controls said timing of image formation in response to a value counted by said counter means after a detection of said particular location.

23. An image display apparatus comprising:

image holding material;

drive means for moving said image holding material;

input means for inputting an image signal, wherein said input means includes generating means for generating an input requirement signal indicating the requirement of the input of said image signal;

image forming menas for forming an image on said image holding material in response to said image signal input by said input means;

a display section for displaying said image formed on said image holding material;

detecting means for detecting a particular location of said image holding material; and control means for controlling a timing for a generation of said input requirement signal for the next image signal in response to the position where said particular location stops.

24. An image display apparatus according to claim 23, wherein said detecting means includes clock means for producing a clock signal and counter means for counting said clock signal, wherein said counter means keeps a value counted from a detection of said particular location to a stop of said image holding material.

25. an image display apparatus according to claim 24, wherein said clock signal is synchronized with the movement of said image holding material.

26. An image display apparatus according to claim 23, further comprising means for preventing said particular location from being displayed on said display section.

27. An image display apparatus according to claim 23, further comprising means for preventing that said image is formed on said particular location.

28. An image display apparatus according to claim 23, wherein said image holding material is formed in the shape of a belt.

29. An image display apparatus comprising:

input means for inputting an image signal;

display means for displaying an image in accordance with said image signal input by said input means on a display section; and control means for controlling said display means in accordance with dimensions of said display section and of said input image signal to automatically display said image at a predetermined location of said display section, wherein said control means allows said image to be displayed at a center, in both a main-scanning direction and in a sub-scanning direction, of said display means.

30. An image display apparatus according to claim 24, wherein said control means allows said image to be displayed from a main-scanning line corresponding to a value based on the dimensions of said display section and of said input image signal.

31. An image display apparatus according to claim 30, wherein said control means includes a count means for counting the number of said main-scannning lines, and said control means allows said image to be displayed when a counting value of said count means reaches a value based on the dimensions of said display section and of said input image signal.

32. An image display apparatus according to claim 29, wherein said control means allows said image to be displayed from a position in a main-scanning direction corresponding to a value based on the dimensions of said display section and of said input image signal.

33. An image display apparatus according to claim 32, wherein said control means includes counting means for counting a clock synchronized with said image signal, and said control means allows said image to be displayed when a counting value, about said main-scanning direction, of said counting means reaches a value based on the dimensions of said display section and of said input image signal.

34. An image display apparatus according to claim 24, wherein said control means controls said display means in synchronization with an input of said image signal.

35. An image display apparatus according to claim 24, wherein said display section is a whole display area of said display means.

36. An image display apparatus comprising:

input means for inputting an image signal;

display means for displaying an image in accordance with said image signal input by said input means on a display section; and control means for controlling, in synchronization with an input of said image signal, said display means in accordance with dimensions of said display section and of said input image section of said display section and of said input image signal to automatically display said image at a predetermined location of said display section, wherein said control means allows said image to be displayed at at least one of the centers in a main-scanning direction and in a sub-scanning direction of said display means.

37. An image display apparatus according to claim 36, wherein said control means allows said image to be displayed from a main-scanning line corresponding to a value based on the dimensions of said display section and of said input image signal.

38. An image display apparatus according to claim 37, wherein said control means includes a count means for counting the number of said main-scanning lines, and said control means allows said image to be displayed when a counting value of said count means reaches a value based on the dimensions of said display section and of said input image signal.

39. An image display apparatus according to claim 36, wherein said control means allows said image to be displayed from a position in a main-scanning direction corresponding to a value based on the dimensions of said display section and of said input image signal.

40. An image display apparatus according to claim 39, wherein said control means includes counting means for counting a clock synchronized with said image signal, and said control means allow said image to be displayed when a counting value, about said main-scanning direction, of said counting means reaches a value based on the dimensions of said display section and of said input image signal.

41. An image display apparatus according to claim 36, wherein said display section is a whole display area of said display means.

* * * * *

UNITED STATES PATENT AND TRADEMARK OFFICE
CERTIFICATE OF CORRECTION

PATENT NO. : 4,766,447 Page 1 of 5

DATED : August 23, 1988

INVENTOR(S) : Masaharu Tsukada

It is certified that error appears in the above-identified patent and that said Letters Patent is hereby corrected as shown below:

IN THE ABSTRACT

Line 2, change "imputs" to --inputs--; and

Line 3, change "photo sen-" to --photosen- --.

COLUMN 2

Line 30, delete "be";

Line 37, change "locating" to --located--;

Line 39, change "locating" to --located--;

Line 42, change "entered" to --entering--; and

Line 57, delete "be".

COLUMN 4

Line 33, change "editted" to --edited--.

COLUMN 6

Line 45, change "hand" to --head--.

UNITED STATES PATENT AND TRADEMARK OFFICE
CERTIFICATE OF CORRECTION

PATENT NO. : 4,766,447
DATED : August 23, 1988
INVENTOR(S) : Masaharu Tsukada

It is certified that error appears in the above-identified patent and that said Letters Patent is hereby corrected as shown below:

COLUMN 7

Line 3, delete "nearly"; and

Line 19, change "roller driver" to --roller drive--.

COLUMN 8

Line 48, change "machibne" to --machine--.

COLUMN 9

Line 11, change "so the" to --to the--;

Line 22, change "becones" to --becomes--; and

Line 28, change "representating" to --representing--.

COLUMN 10

Line 6, change "then" to --now--;

Line 40, change "millemeter" to --millimeter--;

Line 53, change "timimg" to --timing--; and

Line 61, change "synchorinized" to --synchronized--.

UNITED STATES PATENT AND TRADEMARK OFFICE

CERTIFICATE OF CORRECTION

PATENT NO. : 4,766,447
DATED : August 23, 1988
INVENTOR(S) : Masaharu Tsukada

It is certified that error appears in the above-identified patent and that said Letters Patent is hereby corrected as shown below:

COLUMN 11

Line 5, change "$N_5$" to --$N_s$--; and change "$P_5$" to --$P_s$--;

Line 67, change "came" to --comes--; and

Line 68, change "directin" to --direction--.

COLUMN 12

Line 5, change "became" to --becomes--;

Line 21, change "became" to --becomes--;

Line 64, change "then" to --now--.

COLUMN 13

Line 23, change "generates" to --generate--.

COLUMN 14

Line 42, change "reached" to --reaches--; and

Line 62, change "reached" to --reaches--.

CERTIFICATE OF CORRECTION

PATENT NO. : 4,766,447 Page 4 of 5

DATED : August 23, 1988

INVENTOR(S) : Masaharu Tsukada

It is certified that error appears in the above-identified patent and that said Letters Patent is hereby corrected as shown below:

COLUMN 15

Line 7, change "then" to --now--.

COLUMN 16

Line 8, change "electronical" to --electronic--; and

Line 9, change "apparaus" to --apparatus--.

COLUMN 17

Line 28, change "outputtwed" to --outputted--.

COLUMN 19

Line 47, delete "nearly".

COLUMN 20

Line 29, change "DTS" to --DST--; and

Line 48, change "counted" to --counts--.

COLUMN 21

Line 36, change "Am" to --An--.

UNITED STATES PATENT AND TRADEMARK OFFICE

CERTIFICATE OF CORRECTION

PATENT NO. : 4,766,447

DATED : August 23, 1988

INVENTOR(S) : Masaharu Tsukada

It is certified that error appears in the above-identified patent and that said Letters Patent is hereby corrected as shown below:

COLUMN 22

Line 1, change "calim" to --claim--.

COLUMN 23

Line 66, change "menas" to --means--.

COLUMN 24

Line 15, change "an" to --An--;

Line 42, change "24" to --29--; and

Line 68, change "24" to --29--.

COLUMN 25

Line 4, change "24" to --29--.

Signed and Sealed this

Thirteenth Day of June, 1989

*Attest:*

DONALD J. QUIGG

*Attesting Officer*

*Commissioner of Patents and Trademarks*